US012334325B2

(12) United States Patent
Baba

(10) Patent No.: US 12,334,325 B2
(45) Date of Patent: Jun. 17, 2025

(54) REDUCTION OF INTERNAL FRAGMENTATION IN ELECTRON ACTIVATED DISSOCIATION DEVICES AND METHODS

(71) Applicant: DH Technologies Development Pte. Ltd., Singapore (SG)

(72) Inventor: Takashi Baba, Richmond Hill (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 243 days.

(21) Appl. No.: 18/025,511

(22) PCT Filed: Sep. 8, 2021

(86) PCT No.: PCT/IB2021/058171
§ 371 (c)(1),
(2) Date: Mar. 9, 2023

(87) PCT Pub. No.: WO2022/053950
PCT Pub. Date: Mar. 17, 2022

(65) Prior Publication Data

US 2023/0360900 A1 Nov. 9, 2023

Related U.S. Application Data

(60) Provisional application No. 63/076,785, filed on Sep. 10, 2020.

(51) Int. Cl.
*H01J 49/00* (2006.01)

(52) U.S. Cl.
CPC ................................ *H01J 49/0054* (2013.01)

(58) Field of Classification Search
CPC .................................................. H01J 49/0054
(Continued)

(56) References Cited

U.S. PATENT DOCUMENTS 8,334,507 B1 * 12/2012 Whitehouse .......... H01J 49/147 250/281
8,546,751 B2 * 10/2013 Franzen ................ H01J 49/424 250/281

(Continued)

OTHER PUBLICATIONS

International Search Report and Written Opinion, PCT/IB2021/058171, dated Dec. 6, 2021, 13 pages.

*Primary Examiner* — Nicole M Ippolito
(74) *Attorney, Agent, or Firm* — Potomac Law Group, PLLC; Reza Mollaaghababa; Brian Hairston

(57) ABSTRACT

An ion sequestering apparatus and methods or systems using one or more auxiliary electrodes in an ion reaction instrument having RF electrodes adapted to guide positively-charged precursor ins along a first axis, and an electron source for introduction of an electron beam along a second axis transverse to the first axis such that electron activated dissociation of the precursor ions into reaction products can occur, the auxiliary electrode configured to apply a supplemental AC signal to permit selective extraction of reaction products while sequestering precursor ions along the second central axis. For example, the supplemental AC signal can comprises an notched white noise signal with a notch that suppresses frequencies at which the precursor ions (and/or charge reduced species that have the same molecular mass but have a different charge state) would otherwise be excited.

20 Claims, 17 Drawing Sheets

(58) Field of Classification Search
USPC .............................. 250/396 R, 281, 282, 283
See application file for complete search history.

(56) References Cited

U.S. PATENT DOCUMENTS

| | | | | |
|---|---|---|---|---|
| 2008/0078927 | A1 | 4/2008 | Guna | |
| 2009/0014645 | A1* | 1/2009 | Chernushevich ... | H01J 49/0077 250/292 |
| 2009/0179148 | A1 | 7/2009 | Yasuda et al. | |
| 2016/0126076 | A1 | 5/2016 | Baba et al. | |
| 2016/0358766 | A1 | 12/2016 | Weisbrod et al. | |
| 2018/0005810 | A1* | 1/2018 | Baba .................. | H01J 49/0054 |

* cited by examiner

REDUCTION OF INTERNAL FRAGMENTATION IN ELECTRON ACTIVATED DISSOCIATION DEVICES AND METHODS

RELATED APPLICATION

This application is a 35 U.S.C. 371 national stage filing of International Application No. PCT/IB2021/058171, filed on Sep. 8, 2021, entitled "Reduction of Internal Fragmentation in Electron Activated Dissociation Devices and Methods" which claims priority to U.S. provisional application No. 63/076,785 filed on Sep. 10, 2020, entitled "Reduction of Internal Fragmentation in Electron Activated Dissociation Devices and Methods," which is incorporated herein by reference in its entirety.

FIELD

The teachings herein relate to activated ion reactions for mass spectrometry, and more particularly, to methods and systems for performing electron activated dissociation (EAD).

BACKGROUND

Ion reactions typically involve the reaction of either a positively or negatively charged ion with another charged species, which can be another positively or negatively charged ion or an electron. In electron activated dissociation (EAD), for example, the charged species is an electron beam and electron impingement on an ion results in the fragmentation of the ion. EAD has been used to dissociate biomolecules in mass spectrometry (MS), and has provided capabilities that cover a wide range of possible applications from regular proteomics in liquid chromatography-mass spectrometry/mass spectrometry (LC-MS/MS) to top down analysis (no digestion), de novo sequencing (abnormal amino acid sequence finding), post translational modification study (glycosylation, phosphorylation, etc.), protein-protein interaction (functional study of proteins), and also including small molecule identification.

The mechanisms for EAD can include, for example, electron capture dissociation (ECD) using electrons having kinetic energies of 0 to 3 eV, Hot ECD (electrons with kinetic energy of 5 to 10 eV), and high energy electron ionization dissociation (HEEID) (electrons with kinetic energy greater than 13 eV). These electron activated dissociations are considered to be complimentary to conventional collision induced or activated dissociations (CID or CAD) and have been incorporated in advanced MS devices.

The usage of the term EAD in the present teachings hereinafter should be understood to encompass all forms of electron-related dissociation techniques, and is not limited to the usage of electrons within any specific degree of kinetic energy.

In conventional MS systems, the electrons are introduced as a transverse beam such that the electrons collide with precursor positive ions as the ions pass in an axial direction through the instrument (or are temporarily trapped within the instrument). For example, the mass spectrometer can include a branched RF ion trap structure in which an electron beam is injected orthogonally into the analytical ion beam with independent control of both the ion and electron beams. See PCT App. No. PCT/IB2014/00893, filed on May 29, 2014, which is incorporated herein by reference in its entirety, for further details. Such devices can operate in either "flow-through" mode or simultaneous trapping mode.

When a transverse beam of electrons is injected into an MS instrument, the electron beam must be controlled such that the electrons are focused and directed into a region where they can most efficiently interact with (i.e. dissociate) the ions passing through the instrument. Electron-activated dissociation is a particularly promising technique for top-down sequencing of proteins and other large sized biological molecules.

In these situations, the charged precursor molecule typically has a highly protonated charge state, typically 30+ or higher. One would ideally like to induce just one cleavage of the molecule, e.g., in the case of protein analysis, producing only one N-terminal and C-terminal fragment pair. However, the produced fragments also have high charge states that can easily capture another electron and fragment further. For example, when a second electron is captured by an N-terminal fragment, this process produces not only a shorter N terminal fragment, but also produces a fragment that does not have the N terminus of the original protein. This type of fragment is called an internal fragment.

In top down sequencing of proteins, such internal fragments are not useful for sequencing because there are too many possibilities of combinations of starting amino acid residues and ending amino acid residues in the internal fragments. Such internal fragments introduce background noise around the precursor m/z. This greatly increases the difficulty of finding highly charged terminal fragments, typically restricting the analyzable size of proteins to under ~300 amino acid residues.

Accordingly, there exists a need for devices and methods that can reduce internal fragmentation during electron-activated dissociation of molecules, especially large, highly charged biological molecules.

SUMMARY

In accordance with the present teachings, methods, systems and devices are disclosed for ion reactions that can reduce internal fragmentation during electron-activated dissociation of molecules, especially during dissociation of large, highly charged biological molecules.

In one aspect of the present teachings, methods for performing ion reactions are disclosed that include the steps of introducing a plurality of ions into a dissociation instrument via a first pathway extending along a first central axis and defined by at least one plurality of electrodes, with an input lens electrode disposed in proximity to one end of the first pathway and an output lens electrode disposed in proximity to the other end of the first pathway; introducing electrons from an electron source via a second pathway extending along a second central axis, said second pathway intersecting the first pathway at an intersection region so that the ions and electrons can interact; and providing at least one auxiliary electrode that can be activated to isolated precursor ions in a sequester region along the second central axis.

The precursor ions are preferably high molecular weight ions. The sequestration occurs by applying a potential to the auxiliary electrode(s), preferably in conjunction with a magnetic field. Sequestration can be selectively applied to precursor ions by a linear radio frequency (RF) quadrupole structure with the auxiliary electrodes providing a "wall" potential. The precursor ions are dissociated by the electron beam in the sequestration region. When the product ions are excited by a supplemental AC signal imposed upon the RF quadrupole, the dissociated reaction products can be selectively removed from the sequestration region. Because of differences in mass and/or charge, the reaction products can overcome the sequestration, leaving only the unreacted precursor ions to be subjected to further electron beam exposure. Thus, almost all of the precursor ions can be eventually dissociated with substantially fewer internal fragments formed by reducing the likelihood of a second electron interaction.

The methods according to the present teachings can further comprise providing at least two auxiliary electrodes with one auxiliary electrode disposed parallel to, and on one side of, the first axis, and another auxiliary electrode disposed parallel to, and on an opposite side of, the first axis. The method can further comprise applying a DC potential to the at least one auxiliary electrode to control the precursor ions such that they are confined to the second pathway where they can interact with an electron beam.

In certain embodiments, the one or more auxiliary electrodes can be elongated structures extending parallel to the first axis from one end proximal to a precursor ion entrance lens to a second end proximal to reaction product extraction lens. For example, the one or more auxiliary electrodes can each have an elongated T-shape with a stem portion closest to the first axis. Alternatively, the one or more auxiliary electrodes can have a notched T-shape.

The methods of the present teachings can further comprise selectively exciting reaction product ions following electron activated dissociation of the precursor ions by driving at least one set of RF electrodes with a supplemental AC signal that excites ions having a responsive m/z value. The selective extraction can be achieved, for example, by the fixed ion trap RF frequency and the amplitude of the drive signal and varying the frequency of the supplemental AC signal to induce resonant excitation of reaction product ions while suppressing frequencies that would excite precursor ions. The methods can further comprise selectively extracting excited reaction product ions by lowering the potential of an extraction lens electrode at an extraction end of the first axis.

In another aspect of the invention, one or more auxiliary electrodes are disclosed for use in an ion reaction apparatus having RF electrodes adapted to guide positively-charged precursor ions along a first axis, and an electron source for introduction of an electron beam along a path transverse to the first axis such that electron activated dissociation of the ions by the electrons can occur, the auxiliary electrode being adapted for disposition parallel to the first axis to drive precursor ions into the electron beam path when a potential is applied to the electrode.

In one embodiment, the auxiliary electrode can be an elongate electrode extending along at least 50 percent of the length of the first pathway (the ion pathway), preferably extending along more than 75 percent of the first pathway, and more preferably extending along substantially the entire length of the first pathway, e.g., the auxiliary electrode terminating proximal to an ion entrance lens at one end and terminating proximal to an ion extraction lens at the other end. In certain embodiments, two auxiliary electrodes can be deployed in the ion reaction cell with one electrode extending parallel to and above the first pathway and the other extending parallel to and below the first pathway. (The terms “above” and “below” are used merely for ease of understanding. For example, in another orientation one of the auxiliary electrodes can extend parallel and to the left of the first pathway while the other electrode extends parallel and to the left of the first pathway.)

In certain embodiments one or both of the auxiliary electrodes can have an elongated ‘T’ shape, as explained further with reference to the drawings. The elongate electrodes can be straight, curved, or form an inverted “V” relative to the first pathway. Alternatively, the elongate electrode can be notched to create a more open region at the intersection of the first (ion) and second (electron) pathways.

In use, the auxiliary electrode(s) act to sequester ions (e.g., precursor ions) in a sequester region along the second central axis upon activation of the electrodes.

According to another aspect, the auxiliary electrodes of the present teachings can be deployed in systems for performing electron activated dissociation comprising, for example, a first set of electrodes, at least a first segment of which is arranged in a quadrupole orientation about a first central axis, wherein the first segment of the first set of electrodes extends axially along the first central axis from a proximal inlet end to a distal end so as to define a first portion of a first pathway extending along said first central axis with a proximal inlet end for receiving precursor ions from an ion source.

The system can also include a second set of electrodes, at least a first segment of which is arranged in a quadrupole orientation about the first central axis so as to define a second portion of the first pathway, wherein said first segment of the second set of electrodes extends axially along said first central axis from a proximal end to a distal outlet end with the proximal end of the second set of electrodes being spaced apart from the distal end of the first set of electrodes such that a transverse pathway extends between the proximal end of the second set of electrodes and the distal end of the first set of electrodes, said transverse pathway extending from a first axial end to a second axial end along a second central axis substantially orthogonal to the first central axis and intersecting with the first pathway at an intersection region.

In certain embodiments, the electrodes of the first and second sets of electrodes are L-shaped electrodes having a longitudinal segment and a transverse segment and wherein the longitudinal segments of each electrode of the first and second sets of electrodes define the first segments of the first and second sets of electrodes, respectively, and the transverse segments of each electrode of the first and second sets of electrodes define the transverse pathway, the transverse segments of two of the electrodes from the first set of electrodes and the transverse segments of two of the electrodes from the second set of electrodes are oriented so as to define a set of transverse electrodes arranged in quadrupole orientation about the second central axis between the first axial end of the transverse pathway and the intersection region.

The systems can further include an electron source disposed proximate to the first axial end of the transverse pathway for introducing a plurality of electrons along the second central axis such that said electrons travel through said transverse pathway in a first transverse direction toward said intersection region; and at least one auxiliary electrode disposed parallel to the first axis to drive precursor ions into the electron beam path when a potential is applied to the auxiliary electrode.

In certain embodiments, the auxiliary electrodes can include a first electrode disposed parallel to, and on one side of, the first axis and a second auxiliary electrode disposed parallel to, and on an opposite side of, the first axis.

In the systems of the present teachings, the one or more auxiliary electrodes can again be an elongated structure extending parallel to the first axis from one end proximal to an precursor ion entrance lens to a second end proximal to reaction product extraction lens. For example, the auxiliary electrode(s) can have an elongated T-shape with a stem portion closest to the first axis. Alternatively, one or more auxiliary electrode can have a notched T-shape.

The systems can further comprise drive circuitry for selectively exciting reaction product ions following electron activated dissociation of the precursor ions by driving at least one set of the quadrupole electrodes with a supplemental AC signal that excites ions having a responsive m/z value.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

Figure 1:
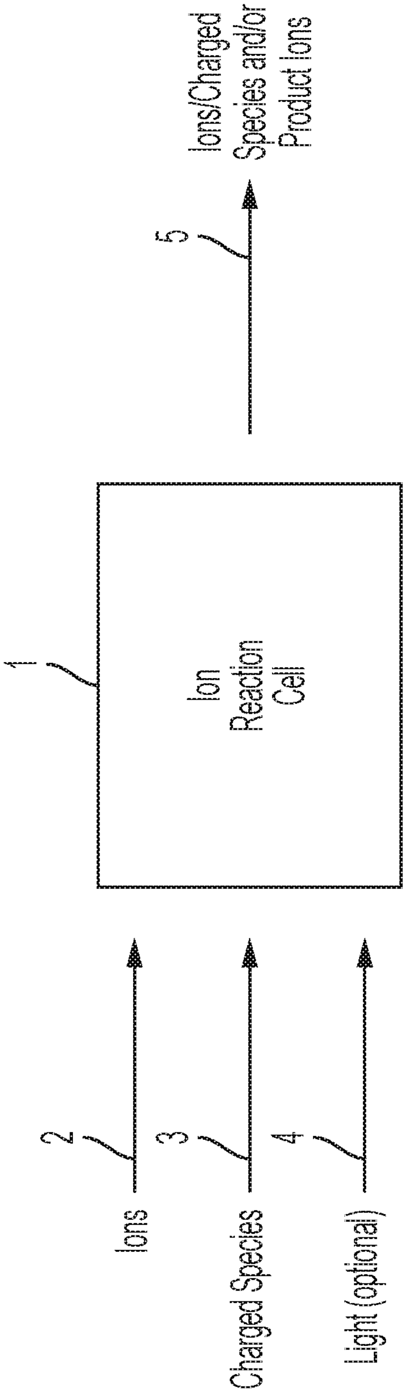
FIG. 1 depicts a general schematic diagram of an ion reaction cell.

Referring to FIG. 1 there is depicted a general schematic diagram of an embodiment of the present teachings. An ion reaction cell 1 receives as inputs a series of reactants being, ions 2 and a charged species 3. Optionally, energy in the form of photons or light 4 is added. The light 4 can be obtained from a laser source and is preferably either light in the ultraviolet or infrared spectrum. The ions 2 can be any ion that is positively (cations) or negatively (anions) charged. The charged species 3 can be electrons or ions that are either positively or negatively charged. As described in more detail below, in certain preferred embodiments, the charged species is a beam of electrons transmitted in a transverse direction to the ions 2 passing through reaction cell 1 to induce collisions and reactions. When the charged species are electrons, the electron source can be a filament such as a tungsten or thoriated tungsten filament or other electron source such as a $Y_2O_3$ cathode. The reaction device can also include a cooling gas, such as helium (He) and nitrogen ($N_2$). The typical pressure of the cooling gas can be between $10^{-2}$ to $10^{-4}$ Torr. A filament electron source is typically used because it is inexpensive but it is not as robust in the presence of oxygen residual gas. Cathodes made of $Y_2O_3$ on the other hand, are more expensive electron sources but are more robust in oxygen so they can be useful for de novo sequencing using radical-oxygen reaction. In operation, an electric current of 1 to 3 Amps is typically applied to heat the electron source, which produces 1 to 10 Watt heat power. A heat sink system of the electron source can be installed to keep the temperature of a utilized magnet, if present, lower than its Curie temperature, at which the magnetization of permanent magnet is lost. Other known methods of cooling the magnet can also be utilized.

Inside the ion reaction cell 1, the ions 2 and charged species 3 together with the optional addition of photons 4 all interact. Depending on the nature of reactants utilized, the interaction can cause a number of phenomena to occur which result in the formation of product ions 5, which can then be extracted or ejected from the ion reaction cell 1 together with potentially other unreacted ions 2 and/or possibly charged species 3 as the circumstances dictate.

When the ions 2 are cations and the charged species 3 are electrons, the cations may capture the electrons and undergo electron capture dissociation in which the interaction between ions 2 and charged species 3 results in the formation of product ions 5 which are fragments of the original ions 2. When the ions 2 are cations and the charged species 3 is an anion, the interaction between the ions 2 and charged species 3 can be electron transfer dissociation in which electrons are transferred from the charged species 3 to the ions 2 which causes the ions 2 to fragment. The stream of species ejected from the ion reaction cell can consist of one or more or a mixture of the ions 2 and/or its fragments.

In addition, for electron associated fragmentation, Hot ECD, high energy electron ionization dissociation (HEEID), activated ions ECD (AI-ECD), Electron Impact Excitation of Ions from Organics (EIEIO), electron detachment dissociation (EDD), negative ETD, and negative ion ECD can be implemented. For example, ECD, ETD and Hot ECD can be implemented when the ions 2 are cations while EDD, negative ETD, negative ion ECD can be used if the ions 2 are anions. Proton transfer reactions can also be implemented if the charged species 3 are selected appropriately.

Figure 2:
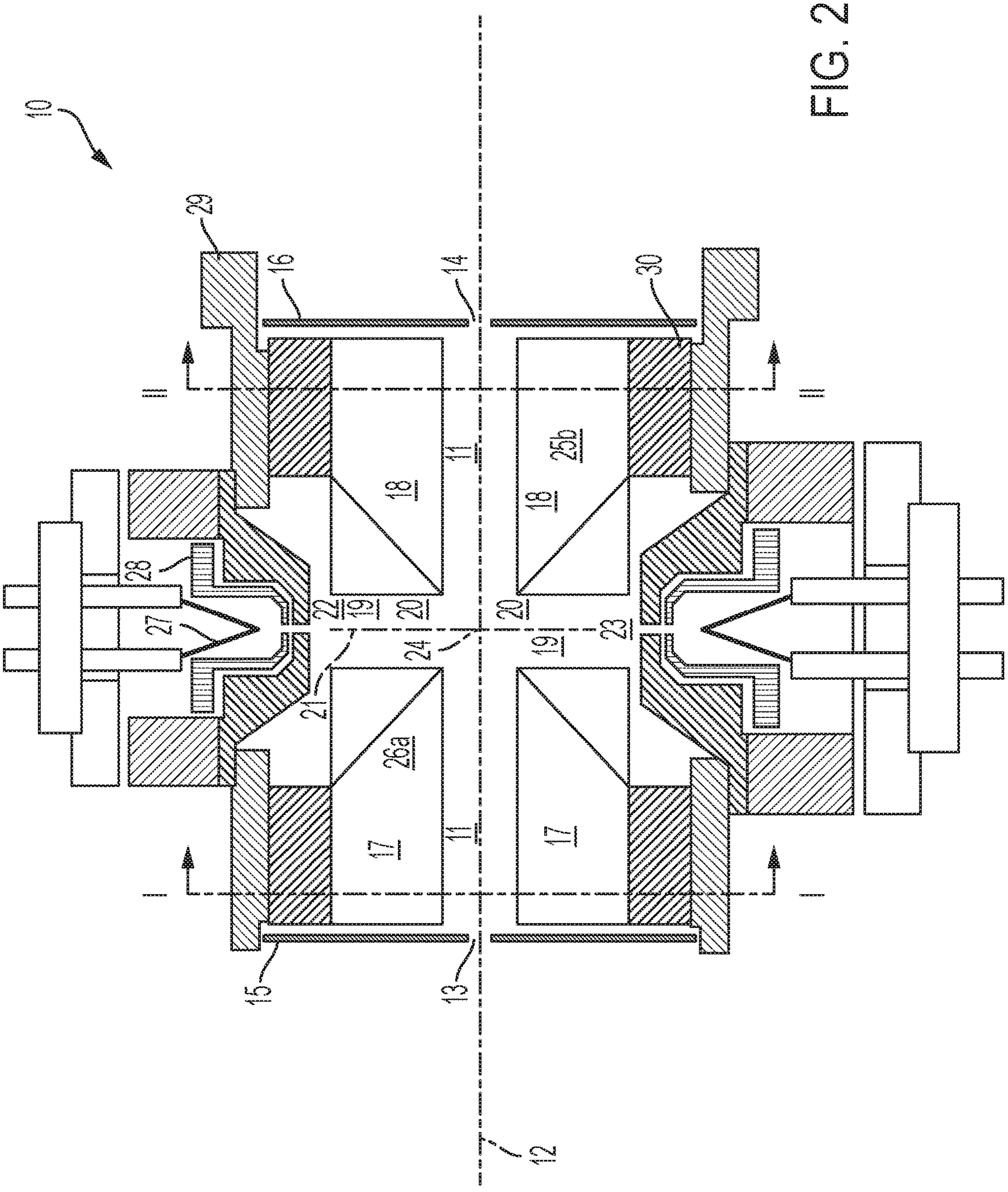
FIG. 2 depicts a cross sectional view in accordance with an embodiment of the present teachings.

Now referring to FIG. 2, there is depicted a side view of an ion reaction apparatus 10 in accordance with an aspect of an embodiment of the present teachings. Shown as a cut out cross section, an outer cylindrical housing 29 and an inner cylindrical housing 30 surround a first pathway 11 having a first central axis 12 and a first axial end 13 and a second axial end 14. This pathway provides a path for ions 2 to enter into the ion reaction apparatus 10.

At each end of the first pathway 11 is situated a lens electrode (15, 16). Lens electrode 15 allows ions 2 to enter into the apparatus 10 and lens electrode 16 controls the ejection of unreacted ions 2 or product ions 5 from the apparatus 10. The lens electrodes need not be situated directly at the axial ends, and can be situated just outside and proximate to the axial ends. As would be appreciated, due to the symmetrical nature of the device, the direction of the ions can be reversed with ions 2 entering through lens electrode 16 and exiting through lens electrode 15 if surrounding ion transport devices are configured appropriately.

The apparatus 10 comprises a first set of quadrupole electrodes 17 mounted to the inner cylindrical housing 30, the electrodes 17 being arranged around the first central axis 12 in a quadrupole type arrangement. While quadrupoles are specifically embodied here for the preferred operation, any arrangements of multipoles could also be utilized, including hexapoles, octupoles, etc. In the figure, only two of the four quadrupole electrodes are depicted, the other two electrodes are directly behind the depicted electrodes. Of the two electrodes depicted in the quadrupole electrodes 17, the electrodes have opposite polarity. These first set of quadrupole electrodes 17 are connected to a RF voltage source and controller (not shown) which serve to provide RF voltages to the electrodes to generate an RF field which can guide the ions 2 towards the first central axis 12, the midpoint of the quadrupoles.

A second set of quadrupole electrodes 18 (only two being depicted, the other two being directly behind) also being mounted to the inner cylindrical housing 30 is situated at a slight distance away from the first set of quadrupole electrodes 17, the distance forming a mostly cylindrical shaped gap 19 between the first set 17 and second set 18 of electrodes. The first 17 and second 18 quadrupole share the same central axis 12 and the rods of the first set of quadrupoles 17 are in line with the second set of quadrupoles 18. While being depicted as a cylindrical shape, it should be appreciated that the shape of this gap is not important, but rather that there exists a gap between the first 17 and second 18 set of quadrupoles. For example, this shape could also be described as being a rectangular box shape, even though the quadrupoles have the same configuration. This second set of quadrupole electrodes 18 is also attached to an RF voltage source and controller (not shown) which serve to provide RF voltages to the electrodes to generate an RF field which can serve to guide ions 2, and/or product ions 5 towards the central axis 12, the midpoint of the second set 18 of quadrupole electrodes.

Figure 3B:
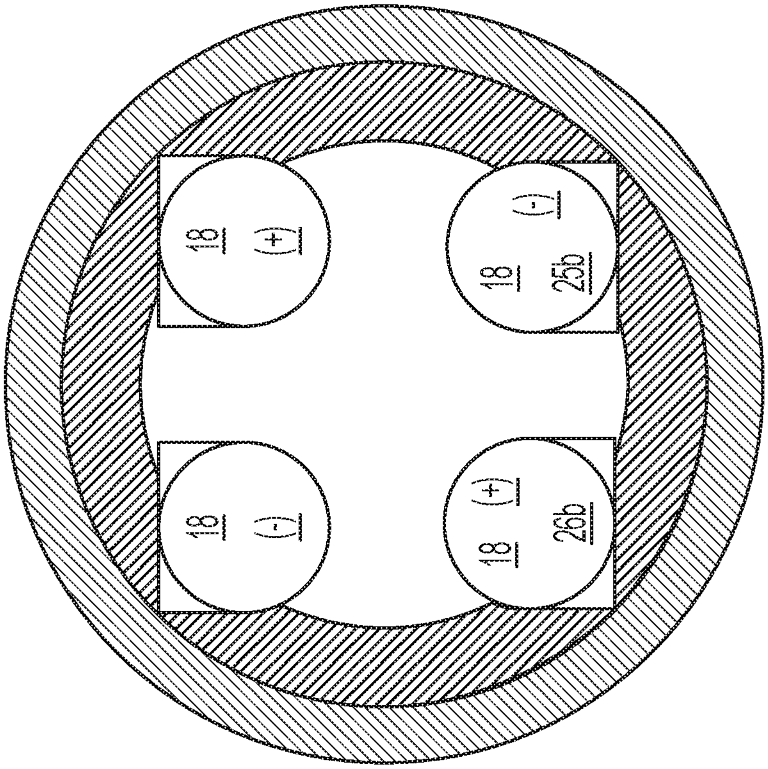
FIG. 3B depicts a cross sectional view of FIG. 2 along the lines II-II.
Figure 3A:
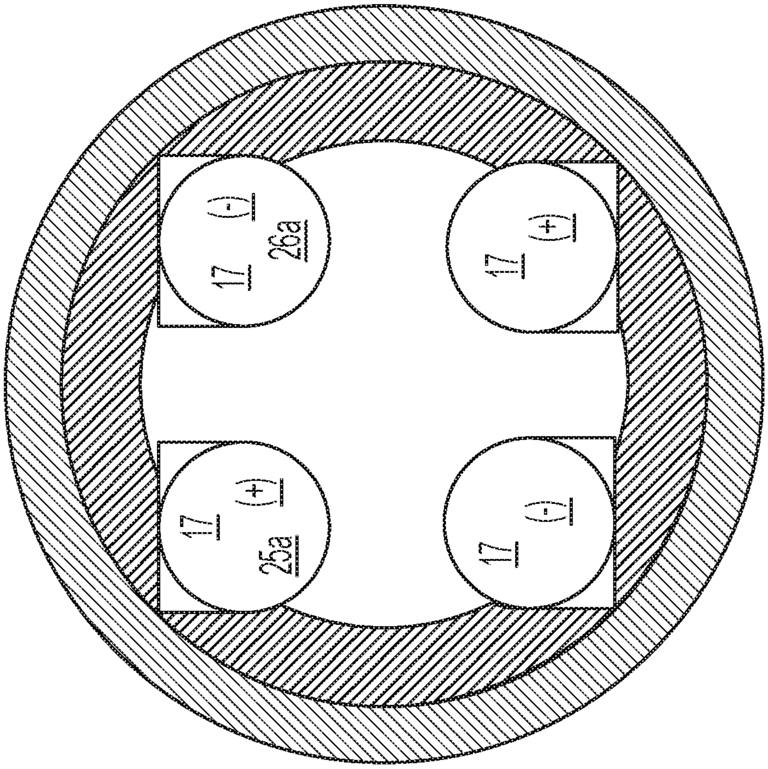
FIG. 3A depicts a cross sectional view of FIG. 2 along the lines I-I

The inner and outer cylindrical housing have a cut-out for insertion of a second pathway 20, having a second central axis 21 which has a first axial end 22 and second axial end 23. This second pathway 20 provides a path for the transport of a charged species 3 into the apparatus 10. The first and second pathways are substantially orthogonal to one another and meet at an intersection point 24, this intersection point being along the first 12 and second 21 central axis. More readily depicted in FIGS. 3A and 3B, which are cross sectional views taken at lines I-I and II-II of FIG. 2 respectively, each of the four electrodes in the first set of quadrupole electrodes 17 can be paired with one of the four electrodes in the second set of electrodes 18, such as for example where each electrode (25*a*, 25*b*) in each electrode pair has the opposite polarity and is directly opposite across the intersection point of the other electrode (25*b*, 25*a*) in the electrode pair, respectively. A similar relationship exists for the electrode pair with electrodes (26*a*, 26*b*).

The same relationship applies to the two remaining electrodes in the first set of electrodes 17 pairing with the two remaining electrodes in the second set of electrodes 18. This orientation of the electrodes results in the RF fields that are generated between the intersection point 24 and the first axial end 22 of the second pathway 20 to be in reverse phase to the RF field generated between intersection point 24 and second axial end 23 of second pathway 20. Because of this configuration of the electrodes, essentially no RF field is present on the center axis 21.

The first axial end 22 of the second pathway 20 contains or has proximate to it, an electron filament 27 to be used to generate electrons for transmission into the second pathway 20 towards the intersection point 24. The first axial end 22 can also contain or have proximate to it, one or more suitable electrode gates 28 to control the entrance of electrons into the apparatus 10. A magnetic field source (not shown), such as a permanent magnet is configured to implement a magnetic field that is parallel to the second pathway 20. This magnetic field is useful when ECD, hot ECD, HEEID, EDD and negative ion ECD are being implemented where the charged species are electrons. When the charged species are reagent anions and include, for example the scenario where the reaction taking place is an ETD reaction, the magnetic field source and magnetic field are not needed.

The presence of the gap may lead to leakage of ions through the sides of the cell in which the quadrupole RF field is weaker in the gap area. This can be mitigated by the usage of a "pole" electrode which is typically a plate electrode positioned such that it prevents this leakage. The pole electrodes are vertically aligned and spaced away from the other electrodes. A positive electric bias on pole electrode serves to repel like charged ions and reaction products from the opening. As would be understood, this blocking electrode is electrically connected to a suitable voltage source.

Referring again to FIG. 2, in certain embodiments, the RF frequencies applied to the quadrupoles are in the range of around 400 kHz to 1.2 MHz, preferably the RF frequency is around 800 kHz.

Figure 4:
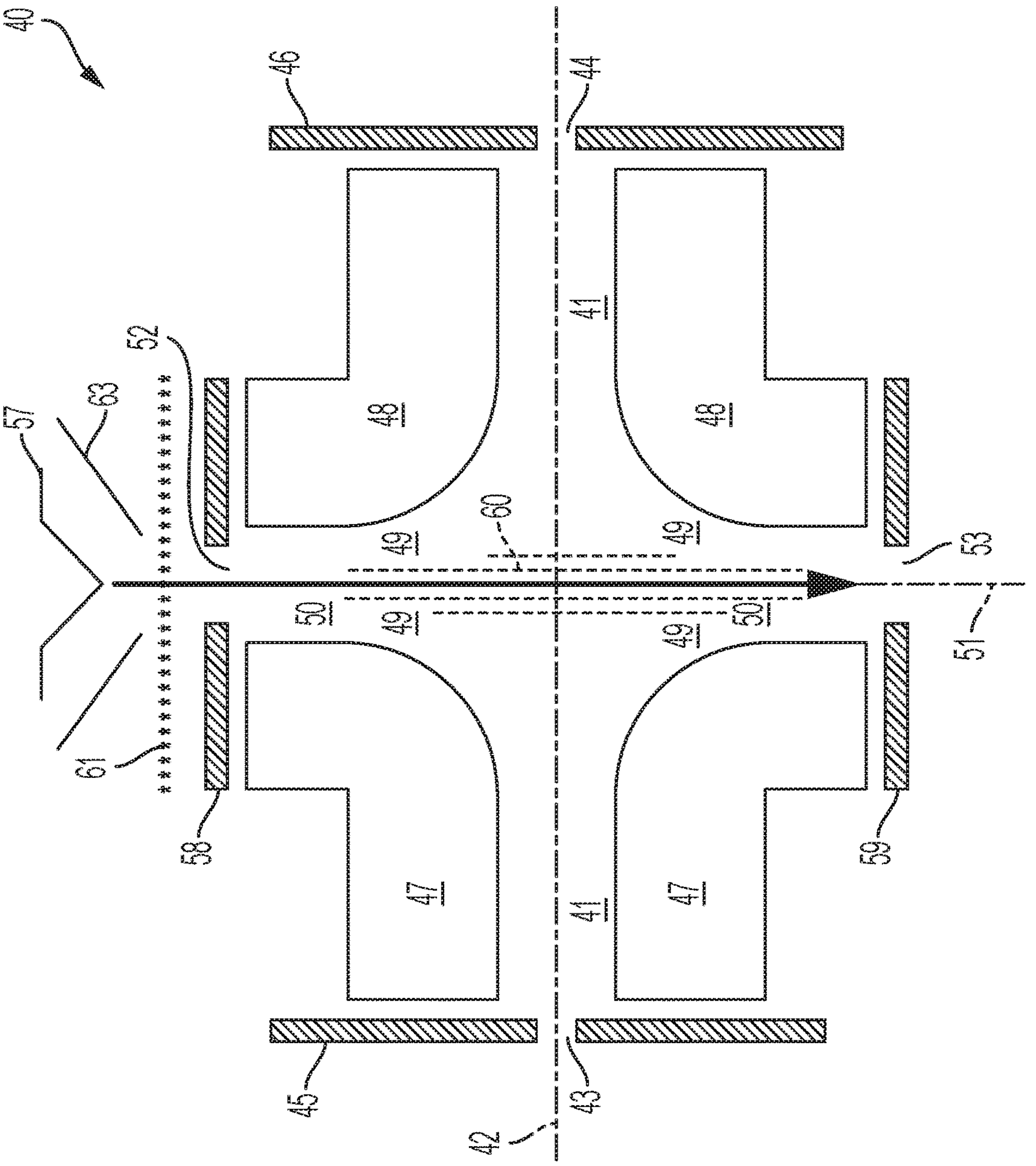
FIG. 4 depicts a simplified side view of an example of electron injection in accordance with an embodiment of the present teachings.

Now referring to FIG. 4, a depiction of another embodiment in side view of the ion reaction device 40 is shown in which only a charged species 3, specifically electrons are injected. The ion reaction device 40 contains a first pathway 41 having a first central axis 42, the pathway 41 has a first axial end 43 and a second axial end 44. At each end of the first pathway 41 is situated an electrode lens (45, 46) which allows for the control of the entrance and ejection of ions from the ion reaction device 40. The apparatus 41 comprises a first set of quadrupole electrodes 47, generally L-shaped, arranged around the first central axis 42. In the figure, only two of the four quadrupole electrodes are depicted, the other two electrodes are directly behind the depicted electrodes. Of the two electrodes depicted in the quadrupole electrodes 47, the electrodes have opposite polarity. A second set of quadrupole electrodes 48 (only two being depicted, the other two being directly behind), also generally L-shaped is situated at a slight distance away from the first set of quadrupole electrodes 47, the distance forming a solid mostly cylindrical shaped gap 49 between the first set 47 and second set 48 of electrodes.

Of the two electrodes depicted in the quadrupole electrodes 48, the electrodes have opposite polarity. The top depicted electrode in each of the first set 47 and second set 48 of quadrupole electrodes are opposite in polarity to one another. As will-be understood by the skilled person, the two electrodes not shown of each set of quadrupole electrodes would have polarities consistent with quadrupole electrode polarities, such as for example the configuration shown in FIGS. 3A and 3B.

A second pathway 50 has a second central axis 51 which has a first axial end 52 and second axial end 53. This second pathway provides a path for the transport of a charged species into the apparatus 40. This orientation of the electrodes results in the RF fields that are generated between the intersection point (of the first pathway 41 and second pathway 50) and the first axial end 52 of the second pathway 50 to be in reverse phase to the RF field generated between the intersection point (of the first pathway 41 and second pathway 50) and said second axial end 53 of said second pathway 50. The first axial end 52 of the second pathway 50 contains or has situated proximate to it, an electron filament 57 to be used to generate electrons 60 for transmission into the second pathway 50. The first axial end 52 can also contain or have situated near and proximate to it, a suitable electrode gate 63 that serves to direct electrons into the apparatus along the second pathway.

Pole electrode 58 further controls the entrance of electrons 60 into the apparatus 40 and also serves to block ions and reaction products from escaping. Another pole electrode 59 is present or situated proximate to the second axial end 53 of the second pathway 50. A magnetic field generator (not shown) is positioned and oriented in such a way so as to create a magnetic field parallel to the second pathway. The direction of the magnetic field can be either from the first axial end 52 to the second axial end 53 or vice versa. This magnetic field is useful when ECD, hot ECD, HEEID, EIEIO, EDD and negative ion ECD are being implemented where the charged species are electrons. A grid 61 can be positioned to act as a gate to switch the electrons 60 near or proximate to the electron filament 57. The RF fields causes the electrons 60 that are focused as they enter the apparatus 40 to become defocused as they approach the intersection point of the first pathway 41 and second pathway 50. As the electrons 60 pass the intersection point, the reversal in polarity of the RF fields causes the electron 60 to become focused again. This creates a more uniform distribution of electrons normal to the first pathway and increases the chances of ion-electron interactions in the apparatus 40 which can also result in better sensitivity. The electron beam creates a localized attractive potential.

Figure 5:
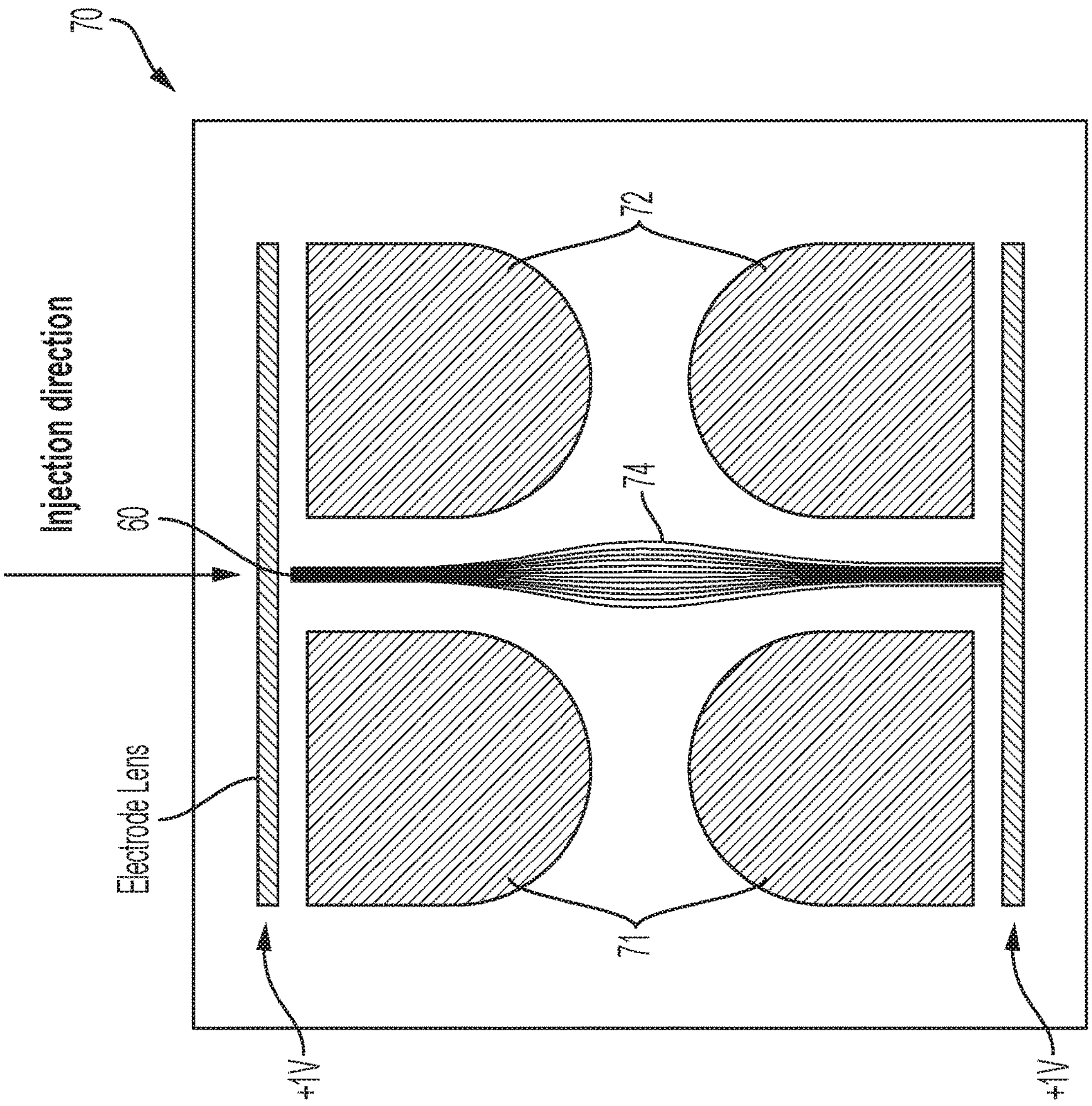
FIG. 5 depicts a simplified side view of the focusing and defocusing effect of the electron beam in accordance with one embodiment of the present teachings.

A clearer view of the electron defocusing effect is depicted in FIG. 5 in which the apparatus 70 is configured in a similar fashion to the apparatus 40 with first set of quadrupole electrodes 71 and second set of quadrupole electrodes 72. In certain embodiments, electron lenses having a +1V potential are disposed at the entrance and exit of the electron beam path, which are used to assist in focusing of the electron beam. Other parts are not repeated for brevity. The streams of electrons 60 into the apparatus 70 is seen to defocus as they approach the center point 74, but are focused again as they pass the center point. A magnetic field (not shown) of 0.1 T is aligned to be parallel to and along the path of electron direction. Again, this magnetic field is useful when ECD, hot ECD, HEEID, EIEIO, EDD and negative ion ECD are being implemented where the charged species are electrons. The RF field can be 100V peak to peak and the electron beam energy can be 0.2 eV at the center.

Figure 6:
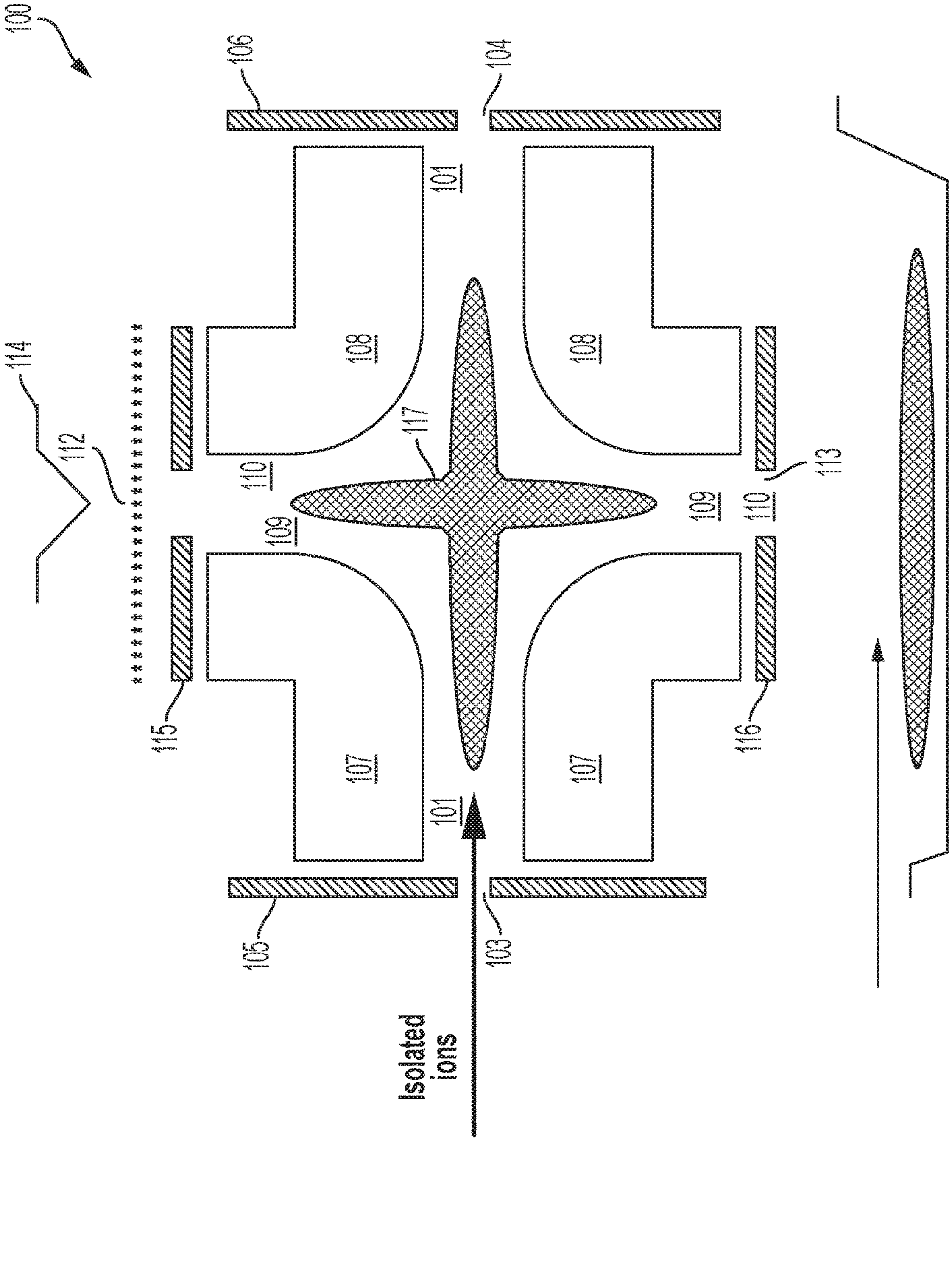
FIG. 6 depicts the injection and trapping of ions into the apparatus in accordance with one embodiment of the present teachings.
Figure 7:
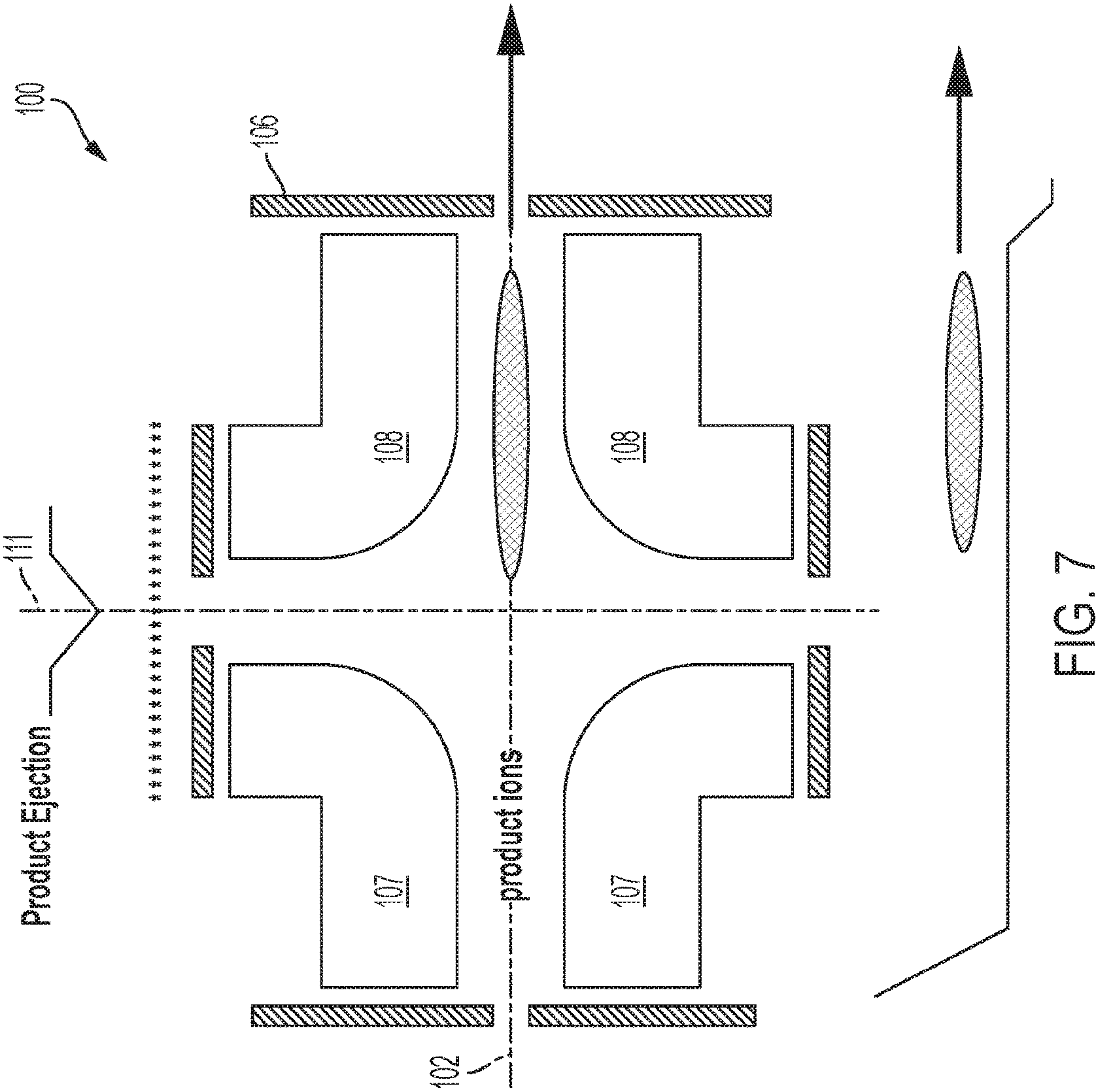
FIG. 7 depicts the ejection of ions or reaction products of an ion reaction from the apparatus in accordance with an embodiment of the present teachings.

FIGS. 6 and 7 depict side views of the ion trap effect generated by an apparatus 100 in accordance with an embodiment of the invention in the conventional trapping manner. A first pathway 101 comprising a first axial end 103 and a second axial end 104 provides for a flow path of ions to be injected from the first axial end 103. A second pathway 110 also comprising a first axial end 112 and a second axial end 113 provides a pathway for an electron beam that is generated by a filament 114. One set of quadrupole electrodes 107 (only two being depicted, the other two being directly behind) attached to an appropriate set of RF voltage sources is directed and serves to guide ions to a midpoint within the quadrupole electrodes 107 to the central axis 102. A second set of quadrupole electrodes 108 (only two being depicted, the other two being directly behind) is situated at a slight distance away from the first set of quadrupole electrodes 107, the distance between the first 107 and second 108 set of quadrupole electrodes forming a gap 109 between the sets of electrodes. This second set of quadrupole electrodes 108 serves to guide ions to a midpoint between the quadrupole electrodes 108 to a central axis 102. Of the two electrodes depicted in the quadrupole electrodes 107, the electrodes have opposite polarity. Of the two electrodes depicted in the quadrupole electrodes 108, the electrodes have opposite polarity. The top depicted electrode in each of the first set 107 and second set 108 of quadrupole electrodes are opposite in polarity to one another. As would be understood by the skilled person, the two electrodes not shown of each set of quadrupole electrodes would have polarities consistent with quadrupole electrode polarities, such as for example the configuration shown in FIGS. 3A and 3B. A magnetic field generator (not shown) creates a magnetic field that is oriented parallel to the direction of the second pathway and in line with the second central axis 111. Again, this magnetic field is useful when ECD, hot ECD, EIEIO, HEEID, EDD and negative ion ECD are being implemented where the charged species are electrons. Entrance lens electrode 105 and exit lens electrode 106 control the inflow and outflow of ions into the apparatus 100, respectively. In this embodiment, entrance lens electrode 105 is set at a potential which allows the inflow of ions into the apparatus 100, whereas the exit lens electrode 106 has a high enough potential to temporarily prevent the out flow of ions from the apparatus.

The second pathway also contains or has situated proximate to it, pole electrodes 115, 116 which are positively biased which prevent the outflow of ions through the axial ends 112, 113 of the second pathway 110. In this embodiment, the electron beam is initially turned off as the ions are injected and no charged species enters the apparatus 100 via the second pathway 110. In this way, the apparatus 100 functions as an ion trap where ions that are injected are accumulated at the intersection point between the first 101 and second pathways 110.

When sufficient ions have been accumulated, the potential of lens electrode 105 is increased so as to prevent the inflow of ions into the apparatus 100, thereby preventing the entrance and exit of ions. The electron beam can then be turned on such that electrons can pass through the aperture of pole electrode 115 into the apparatus 100. Upon this, electrons may interact with the ions and undergo EAD resulting in fragmentation into product ions. Once sufficient fragmentation has occurred, the filament 114 can be turned off, the potential of lens electrode 105 can be increased and the potential of lens electrode 106 can be lowered to allow the exit of product ions through the second axial end 104 as depicted in FIG. 7. A cooling gas, such as for example helium or nitrogen gas may be introduced in the device 100 to obtain more efficient trapping. Each of the electrodes from the first 107 and second 108 quadrupole has a first portion of the electrode which is substantially oriented parallel to the first central axis 102 whereas the second portion is substantially oriented parallel to the second central axis. As each portion of each electrode has the same polarity for a given electrode, the electrodes collectively can act as a trap directing the ions to both the central axis 102 and the central axis 111. In this manner, the apparatus 100 acts as a two-dimensional trap, or more precisely, a linear trap in two directions. Though depicted in FIG. 6 as having a smooth rounded transition between the first portion and the second portion, other configurations such as sharp corners can also be utilized. Shown below the apparatus in each of FIGS. 6 and 7 is a graph of spatial potentials for positive ions in the horizontal direction in the apparatus along the central axis 102.

In FIG. 6, the potential at the entrance is approximately equal to that of the incoming isolated ions and therefore allows ions to pass through to enter the apparatus, the potential present at the exit is higher than that of the isolated ions entering the apparatus and therefore the ions do not exit through the right of the apparatus and become trapped. In FIG. 7, the entrance potential is higher thereby preventing the ions from exiting back through the entrance, whereas the potential in the exit is lower than that of the product ions, thereby allowing the ions to leave the apparatus.

Figure 8:
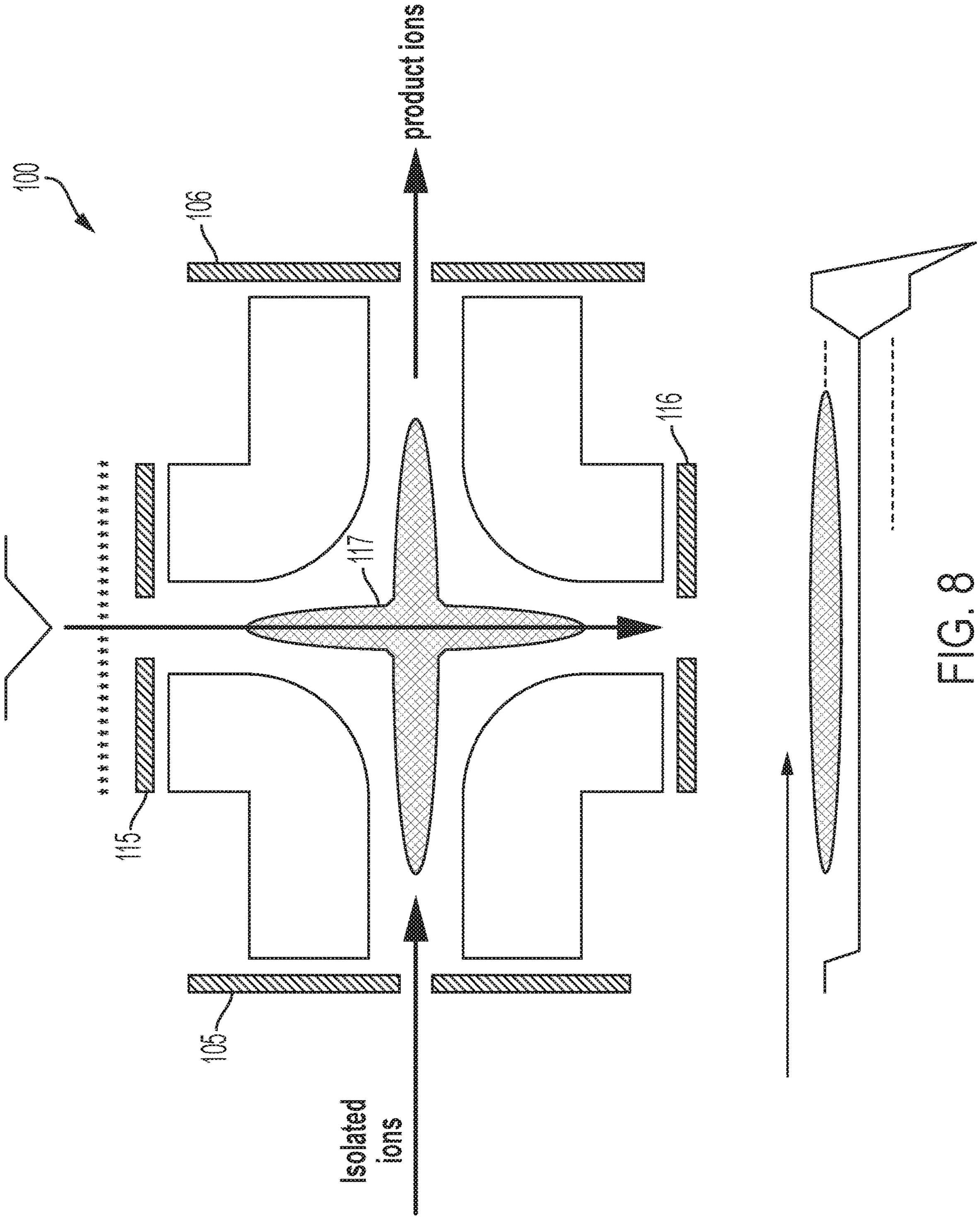
FIG. 8 depicts a continuous mode operation of an embodiment of the present teachings where ions and electrons are continuously injected and a stream of product ion as a result of ion-electron interactions is continuously ejected.

FIG. 8 depicts a side view of the operation of apparatus 100 in the simultaneous trapping mode in which ions continuously enter through lens 105 and electrons 117 enter continuously through an aperture in pole electrode 115. The interactions between ions and electrons 117 can cause EAD which results in fragmentation and the formation of product ions. These product ions as well as unreacted ions are extracted from the apparatus through lens electrode 106 in a semi-continuous fashion in which the lens electrode 106 switches between an open and closed position. When in a closed position, the potential located in the lens electrode is higher than that of the ions contained within in the apparatus, thereby causing ions to accumulate and allow increased residence and reaction time so that an EAD reaction can take place. When ions are to be extracted, the lens electrode 106 is opened by lowering the potential in the lens allowing the product ions to be removed. Shown below the apparatus 100 in FIG. 8 is a horizontal spatial representation of the potential for positive ions which show the exit potential oscillating between a high potential and a low potential which represents closed and opened positions of the lens 106.

Figure 9:
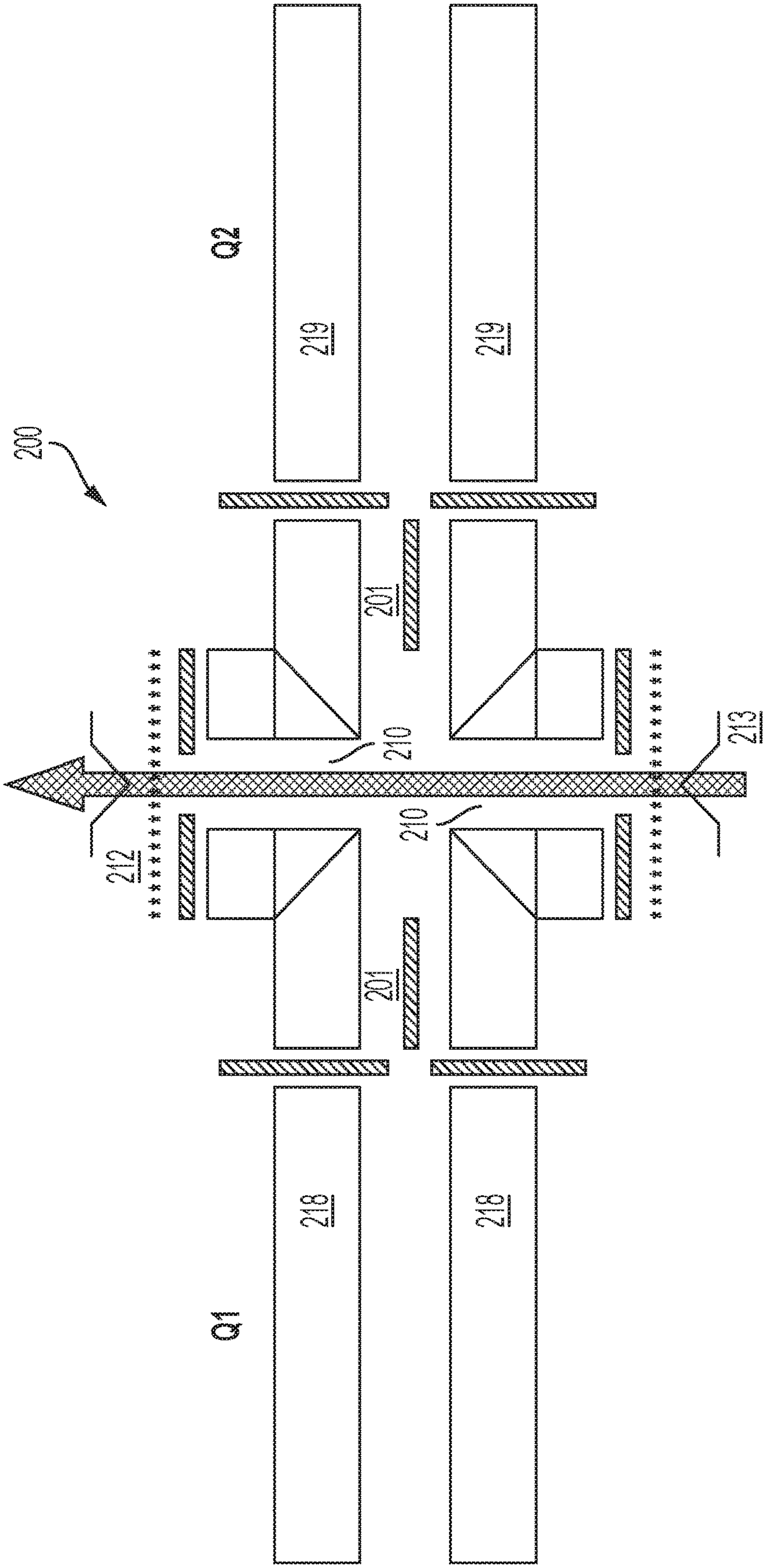
FIG. 9 depicts a cross sectional view of an embodiment of the present teachings illustrating the orientation of a magnetic field.

Now referring to FIG. 9, another system 200 in accordance with the present teachings is depicted in side view inserted in series in between two quadrupoles. Quadrupole filter Q1 having quadrupole rods 218 is situated upstream of the apparatus 200 and serves to trap/guide/isolation/etc. ions and provides a source of ions at the entrance of the apparatus 200. Quadrupole Q2, having quadrupole rods 219 is situated downstream of the apparatus 200 and can serve to receive product ions and unreacted ions and either trap/guide/etc. these species in the quadrupole for further analysis or processing. The apparatus is similar to the apparatus described previously and will not be described in detail for brevity. The apparatus 200 has first pathway 201 and second pathway 210. The apparatus 200 contains two filaments, each one disposed at either the first axial end 212 or second axial end 213 of the second pathway 210. This configuration allows for the independent operation of the filaments so that if one filament is being used and suddenly becomes inoperative, the other filament can then be used as a spare and activated such that there is no or minimal downtime.

While specifically exemplifying the use of additional quadrupoles, it will be appreciated that other types of devices can be situated either before or after the apparatus in accordance with the present teachings. For example, the devices can include various ion guides, filters, traps, ion mobility devices, including differential mobility and field-asymmetric ion mobility spectrometers and other mass spectrometer devices such as Time-of-Flight mass spectrometers. In various embodiments, electron control optics and ion control optics are completely separated, so independent operations on both charged particles are possible. For electrons, electron energy can be controlled by the potential difference between the electron source and the intersection point between the ion pathway and the charged species pathway. The charged species pathway can be controlled in an ON/OFF fashion by use of a gate electrode. Lens can be positioned at or proximate either axial end of the second pathway and when positively biased, cause the charged species, when such species are electrons, to focus. Ions which are introduced through the other pathway are stable near theses lens since they are biased positively. It will also be appreciated that the design of the present invention are also applicable to higher order multipole structures, such as hexapole or octupole RF electrode structures.

For additional teachings on electron activated dissociation, see U.S. Patent App. Pub. No. 20180005810 entitled "Electron Induced Dissociation Devices and Methods filed Dec. 21, 2015, PCT App. No. PCT/IB2014/00893, entitled "Inline Ion Reaction Device Cell And Method of Operation," filed on May 29, 2014, and PCT App. No. PCT/IB2012/002621, entitled "Ion Extraction Method For Ion Trap Mass Spectrometry" filed on Dec. 6, 2012, each of which is incorporated herein by reference in its entirety.

Figure 10:
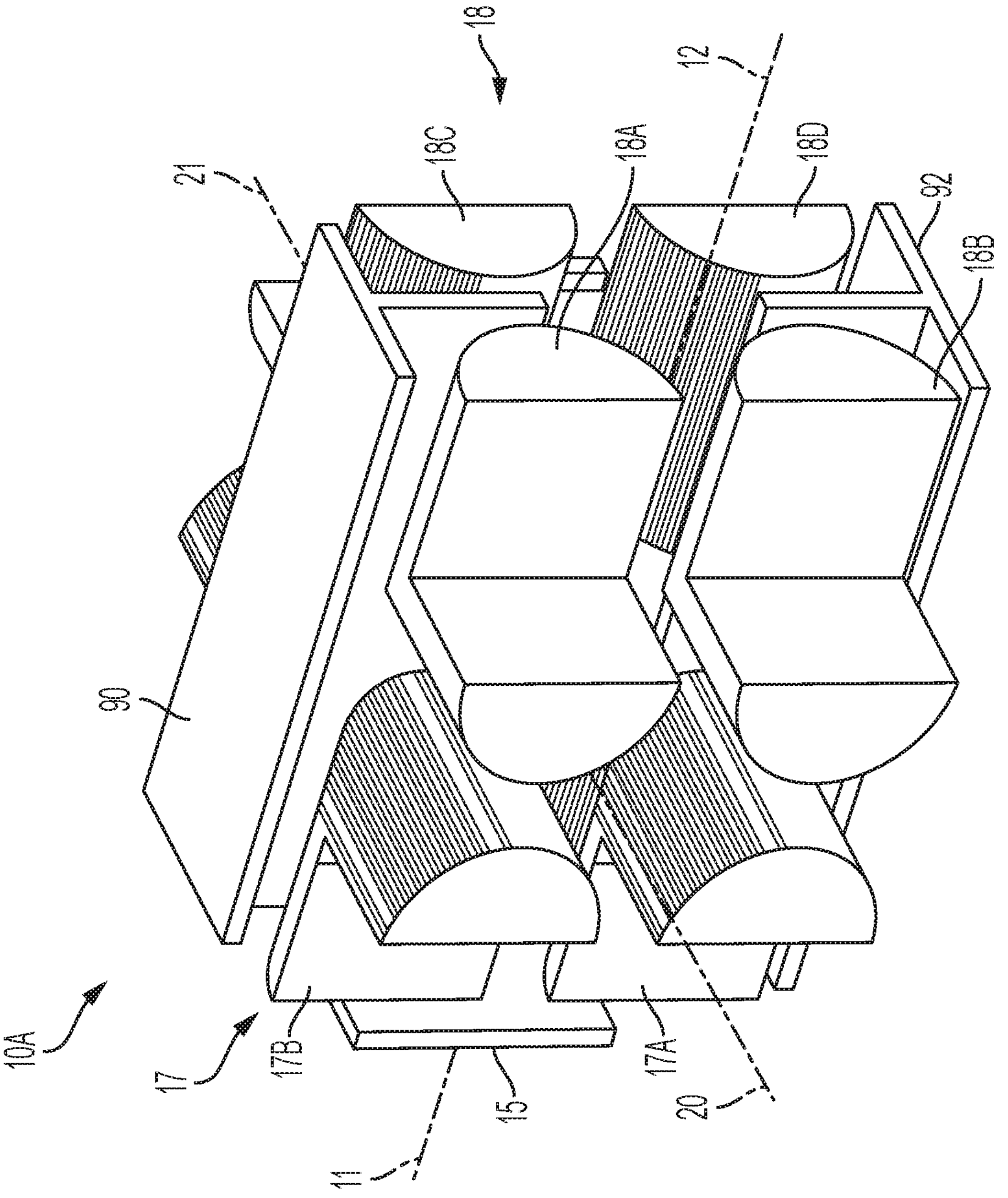
FIG. 10 is a schematic perspective view of an ion reaction cell with auxiliary electrodes according to the present teachings.

FIG. 10 depicts a schematic perspective view of an ion reaction instrument 10A similar to that depicted in plan view in FIG. 2. Ancillary components have been omitted for clarity of description. Ion reaction apparatus 10A includes a first pathway 11 having a first central axis 12 and a first axial end 13 and a second axial end 14. This pathway provides a path for ions 2 to enter into the ion reaction apparatus 10.

At each end of the first pathway 11 is situated a lens electrode. Entrance lens electrode 15 allows ions to enter into the apparatus 10A and a second (exit) lens electrode at the opposite end of the pathway (not shown) controls the ejection of unreacted ions or reaction product ions from the apparatus 10A. The lens electrodes need not be situated directly at the axial ends, and can be situated just outside and proximate to the axial ends. As will be appreciated, due to the symmetrical nature of the device, the direction of the ions can be reversed with ions entering through lens electrode 16 and exiting through lens electrode 15 if surrounding ion transport devices are configured appropriately.

The apparatus 10A comprises a first set of quadrupole electrodes 17 mounted to an inner cylindrical housing (not shown), the electrodes 17 being arranged around the first central axis 12 in a quadrupole type arrangement. While quadrupoles are specifically embodied here, any arrangements of multipoles could also be utilized though the quadrupole arrangement is the preferable in most instances, including hexapoles, octupoles, etc. In the figure, only two of the four quadrupole electrodes are depicted, the other two electrodes are directly behind the depicted electrodes. Of the two electrodes 17A and 17B depicted in the quadrupole electrodes 17, the electrodes have opposite polarity. These first set of quadrupole electrodes 17 are connected to a RF voltage source and controller (not shown) which serve to provide RF voltages to the electrodes to generate an RF field which can guide the ions towards the first central axis 12, the midpoint of the quadrupoles.

A second set of quadrupole electrodes 18 also being mounted to the inner cylindrical housing 30 is situated at a slight distance away from the first set of quadrupole electrodes 17, the distance forming a mostly cylindrical shaped gap between the first set 17 and second set 18 of electrodes. The first 17 and second 18 quadrupole share the same central axis 12 and the rods of the first set of quadrupoles 17 are in line with the second set of quadrupoles 18. While being depicted as a cylindrical shape, it should be appreciated that the shape of this gap is not important, but rather that there exists a gap between the first 17 and second 18 set of quadrupoles. For example, this shape could also be described as being a rectangular box shape, even though the quadrupoles have the same configuration. This second set of quadrupole electrodes 18A. 18B, 18C and 18D is also attached to an RF voltage source and controller (not shown) which serve to provide RF voltages to the electrodes to generate an RF field which can serve to guide precursor ions, and/or reaction product ions towards the central axis 12, the midpoint of the second set 18 of quadrupole electrodes.

The inner and outer cylindrical housing have a cut-out for insertion of a second pathway 20, having a second central axis 21. This second pathway 20 provides a path for the transport of a charged species (e.g., electrons) into the apparatus 10. The first and second pathways are substantially orthogonal to one another and meet at an intersection point inside the apparatus 10A, this intersection point being along the first 12 and second 21 central axis. Each of the four electrodes in the first set of quadrupole electrodes 17 can be paired with one of the four electrodes in the second set of electrodes 18, such as for example where each electrode (17A, 17B) in each electrode pair has the opposite polarity and is directly opposite across the intersection point from the other electrode (18B, 18A) in the electrode pair, respectively. A similar relationship exists for the electrode pair with electrodes.

The same relationship applies to the two remaining electrodes in the first set of electrodes 17 (not shown) pairing with the two remaining electrodes in the second set of electrodes 18C and 18D. This orientation of the electrodes results in the RF fields that are generated between the intersection point 24 and the first axial end 22 of the second pathway 20 to be in reverse phase to the RF field generated between intersection point 24 and second axial end 23 of second pathway 20. Because of this configuration of the electrodes, essentially no RF field is present on the center axis 21.

A first axial end of the second pathway 20 contains or has proximate to it, an electron filament (described above) to be used to generate electrons for transmission into the second pathway 20 towards the intersection point within the apparatus 10A. The first axial end can also contain or have proximate to it, one or more suitable electrode gates to control the entrance of electrons into the apparatus 10A. A magnetic field source (not shown), such as a permanent magnet is configured to implement a magnetic field that is parallel to the second pathway 20. This magnetic field is useful when ECD, hot ECD, HEEID, EDD and negative ion ECD are being implemented where the charged species are electrons.

The presence of the gap may lead to leakage of ions through the sides of the cell in which the quadrupole RF field is weaker in the gap area. This can be mitigated by the usage of a "pole" electrode which is typically a plate electrode positioned such that it prevents this leakage. The pole electrodes are vertically aligned and spaced away from the other electrodes. A positive charge on pole electrode serves to repel like charged ions and reaction products from the opening. As would be understood, this blocking electrode is electrically connected to a suitable voltage source.

Also shown in FIG. 10 are two auxiliary electrodes 90 and 92 according the present teachings. These auxiliary electrodes are adapted for disposition parallel to the first axis to drive precursor ions into the electron beam path when a potential is applied to the auxiliary electrodes, as described in more detail below.

Figure 11B:
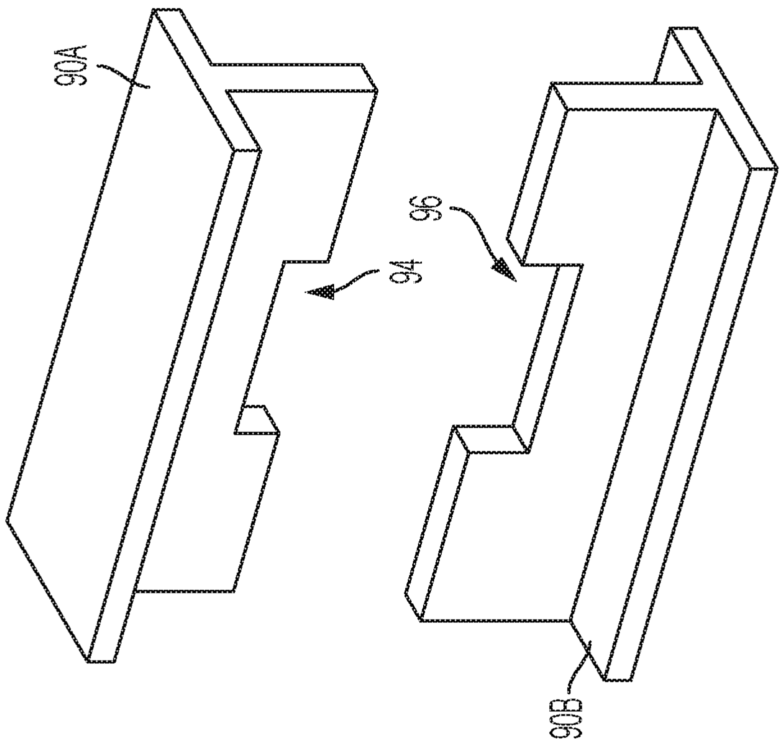
FIG. 11B is a schematic perspective view of another embodiment of auxiliary electrodes for use in the apparatus of FIG. 10.
Figure 11A:
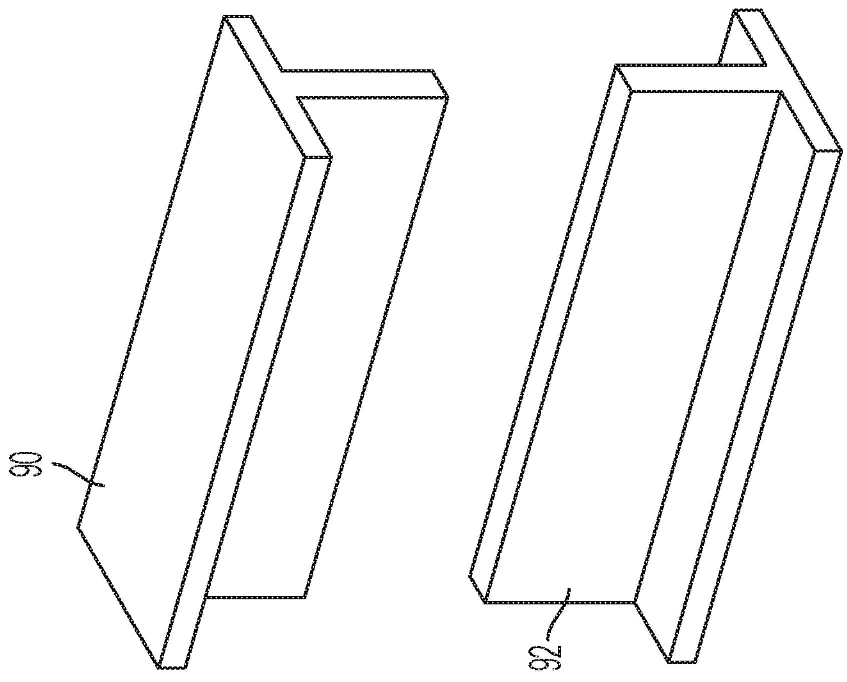
FIG. 11A is a schematic perspective view of one embodiment of auxiliary electrodes for use in the apparatus of FIG. 10.

In FIG. 11A, the auxiliary electrodes are shown by themselves with all the other elements of the apparatus 10A removed. In certain embodiments, auxiliary electrodes 90 and 922 are each generally elongated structures extending parallel to the first axis from one end proximal to the precursor ion entrance lens to a second end proximal to reaction product extraction lens. In certain embodiments, as shown in FIG. 11A, electrodes 90 and 92 can have an elongated T-shape with their stem portions closest to the first axis 21. In an alternative embodiment illustrated in FIG. 11B, the auxiliary electrodes 90A and 90B are T-shaped but have central notches 94 and 96 in the intersection region of the ion and electron paths.

Figure 12:
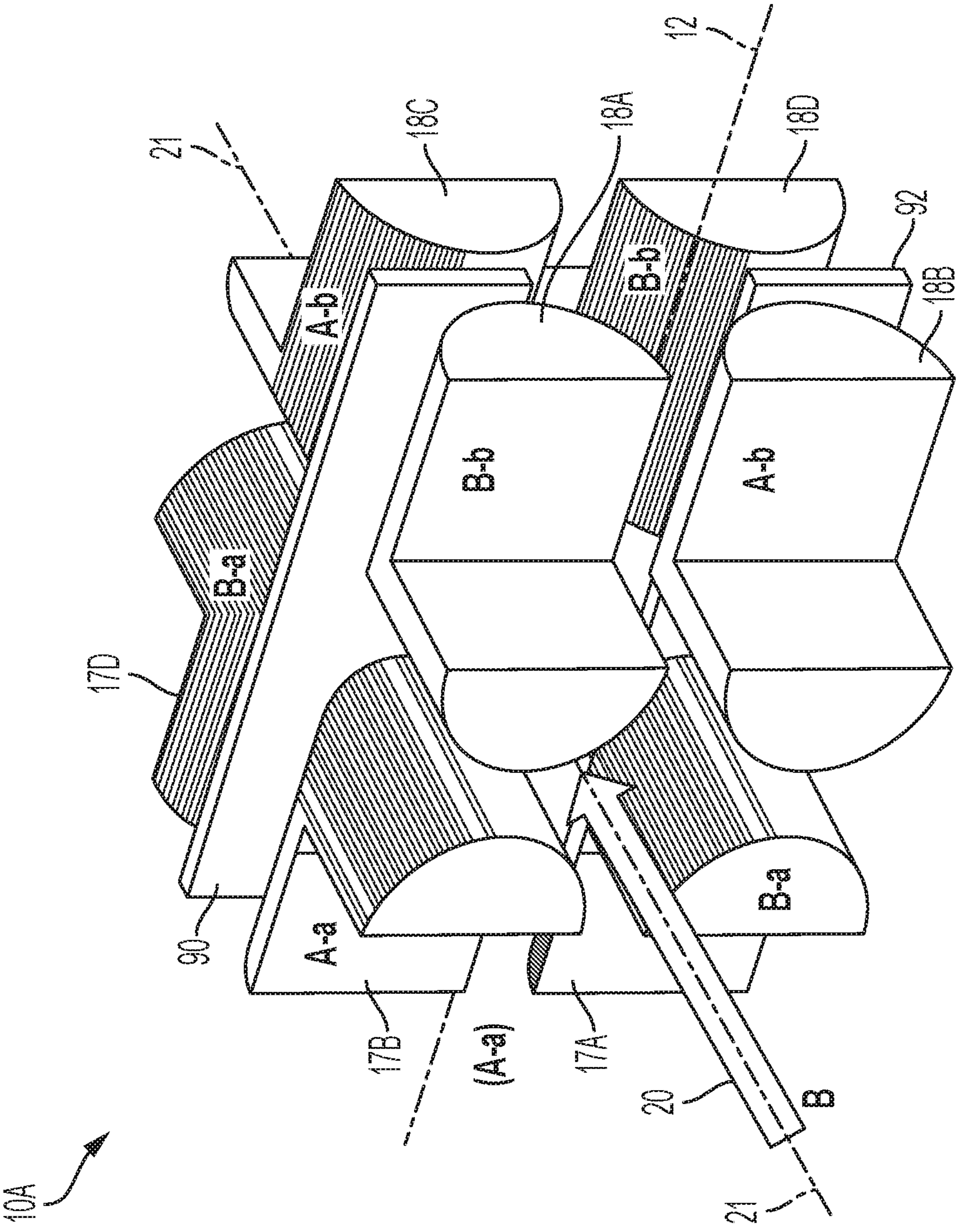
FIG. 12 is a schematic perspective view of an ion reaction cell with auxiliary electrodes showing exemplary quadrupole RF drive signals for inducing resonant excitation of ions according to the present teachings.

FIG. 12 is another perspective view of an apparatus according to the present teachings similar to that shown in FIG. 10. Portions of the upper and lower auxiliary electrodes 90 and 92 have been removed for a better view of the quadrupole electrodes. By applying a potential (position bias) to one or both of the auxiliary electrodes 90, 92, the positively charged precursor ions are driven from the ion path along axis 12 and forced into the electron beam path (along axis 21) where they remain in either a front portion of the electron beam path or a rear portion of the electron beam path (or both). Once the precursor ions are sequestered, the electron beam can be activated (as described above) to deliver a stream of electrons (labeled "B") along the second axis 21 and to induce electron activated dissociation of the precursor ions.

FIG. 12 also illustrates the signals that can be applied to the quadrupole electrodes to extract reaction product ions. Essentially, variants of an excitation signal can be applied to the upstream L-shaped electrodes (17A-17D) of the first quadrupole 17 as well as the L-shaped downstream electrodes (18A-18D) of the second quadrupole.

Figure 13:
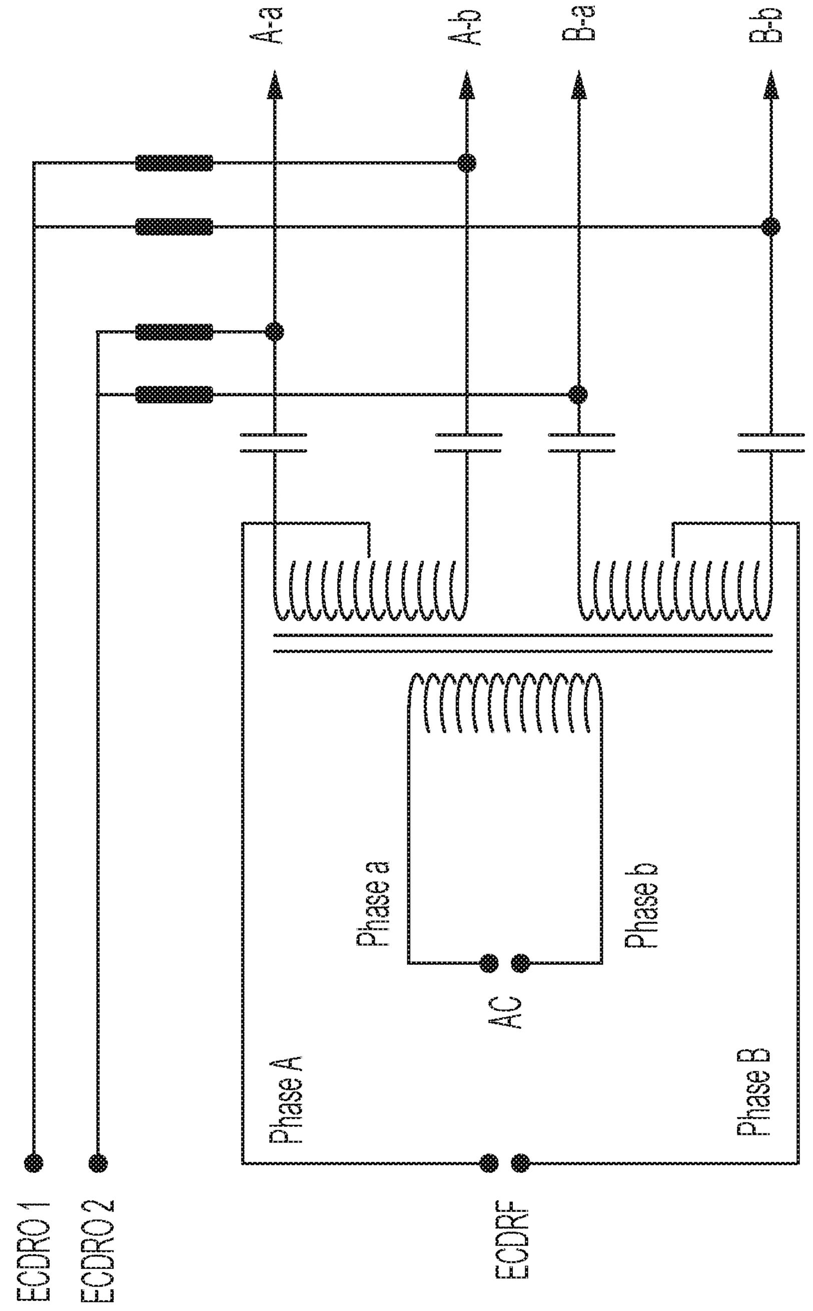
FIG. 13 is an exemplary circuit for generating the drive signals of FIG. 12.

FIG. 13 is an illustrative circuit diagram of one embodiment of circuitry useful in driving the quadrupole electrodes. The net effect of these signals is to impart resonant excitation to a class of ions present in the apparatus 12A depending on their mass-to-charge ratio. Ions that have a responsive m/z will become excited to the point that they can overcome the sequestering potential of the auxiliary electrodes 90 and/or 92. By opening the ion extraction lens (not shown) these excited ions can be selectively extracted from the apparatus 12A while other ions that are not so excited will remain sequestered in the electron beam path 20 (along axis 21). By sweeping the frequency of the excitation signal, ions having a various m/z characteristics can be selectively excited.

Thus, according to the present teachings, by modulating the frequency according to a pattern that has one or more notches (subsets of frequencies at which the signal is suppressed) all of the ions present in the sequestration region except for ions having a particular m/z can be excited and permitted to escape sequestration. For example, a white noise signal can be applied with a frequency notch correspond to the frequencies at which the precursor ions would otherwise be excited, the white-noise supplemental AC can selectively extract reaction product ions while retaining the precursor ions so that they can further interact with the electron beam. If the notches further correspond to the frequencies at which the charge reduced species, which have the same molecular mass but have a different charge, would otherwise be excited, the white-noise supplemental AC can selectively extract fragment ions while retaining the precursor ions and the charge reduced species so that they can further interact with the electron beam.

As a result of the present teachings, reaction product ions produced by electron activated dissociation (EAD) can be removed from the apparatus quickly before further internal fragmentation can occur while precursor ions remain sequestered for further EAD processing, thereby increasing overall yield of reaction product ions as well.

Figure 14A:
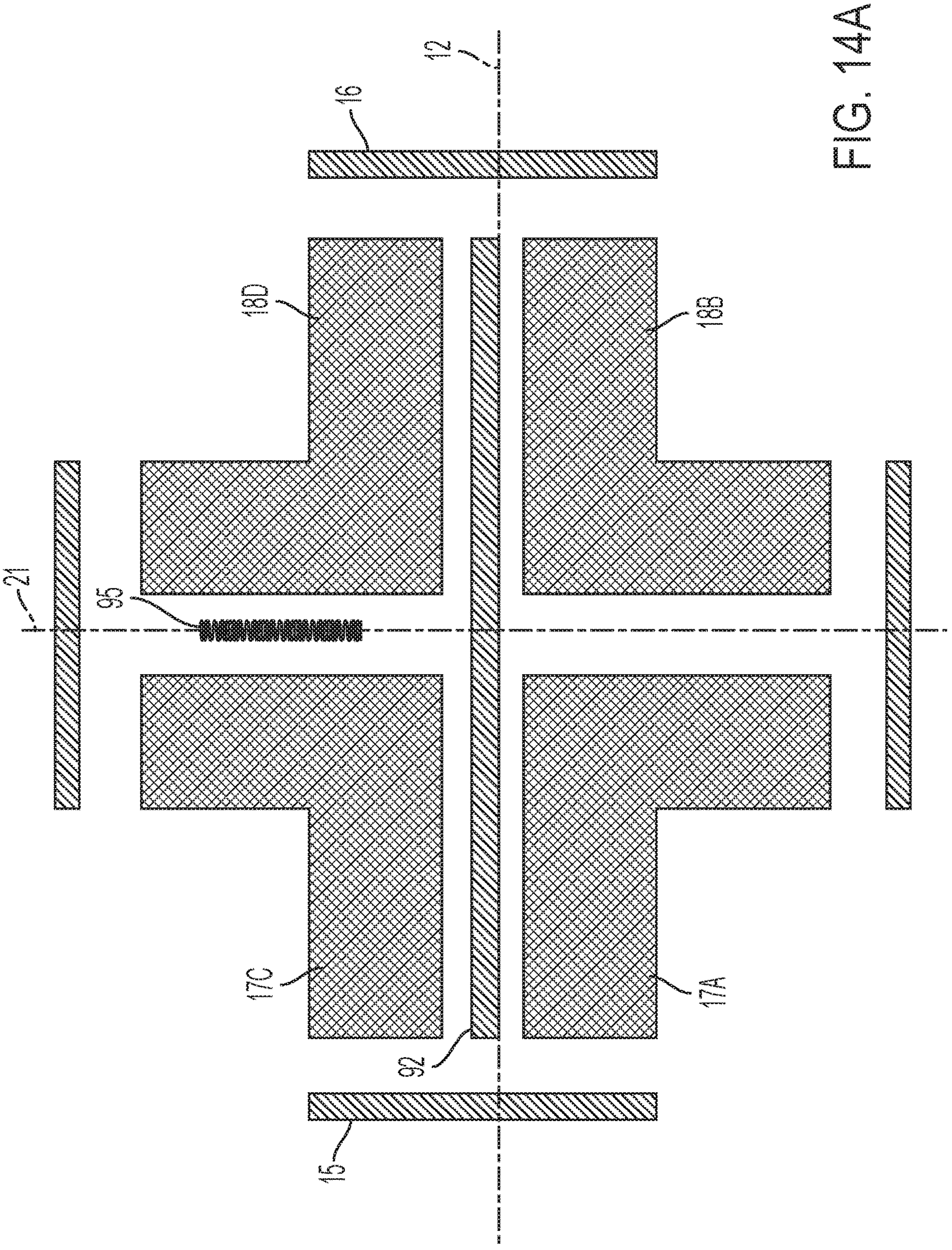
FIG. 14A is a schematic illustration of positively charged precursor ions being confined according to the present teachings in an upper branch 95 of an electron beam path in the apparatus of FIG. 10.
Figure 14B:
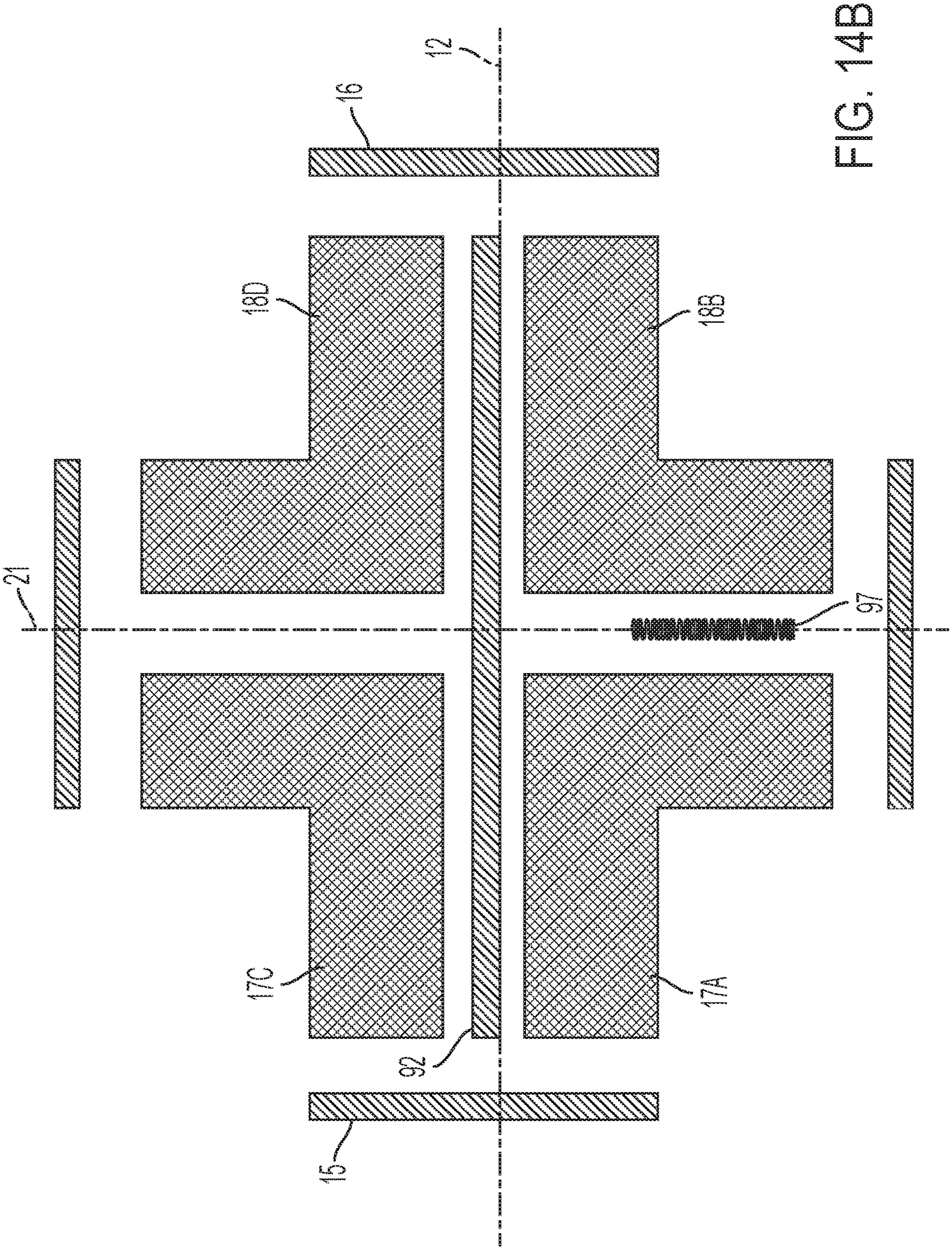
FIG. 14B is a schematic illustration of positively charged precursor ions being confined according to the present teachings in lower branch 95 of an electron beam path in the apparatus of FIG. 10.

The process of sequestration is further illustrated in FIGS. 14A and 14B. In these cross-sectional views of apparatus, precursor ions have been permitted entrance into the apparatus along axis 12 (by temporarily lowering the potential of input lens electrode 15). When the potential is raised on lens electrode 15 and similar bias applied to extraction lens electrode 16 and auxiliary electrode 92 and companion auxiliary electrode 90 (not shown in this view), the positively charged precursor ions are propelled into the upper branch 95 or lower branch 97 (or both regions) of the electron beam path.

Figure 15:
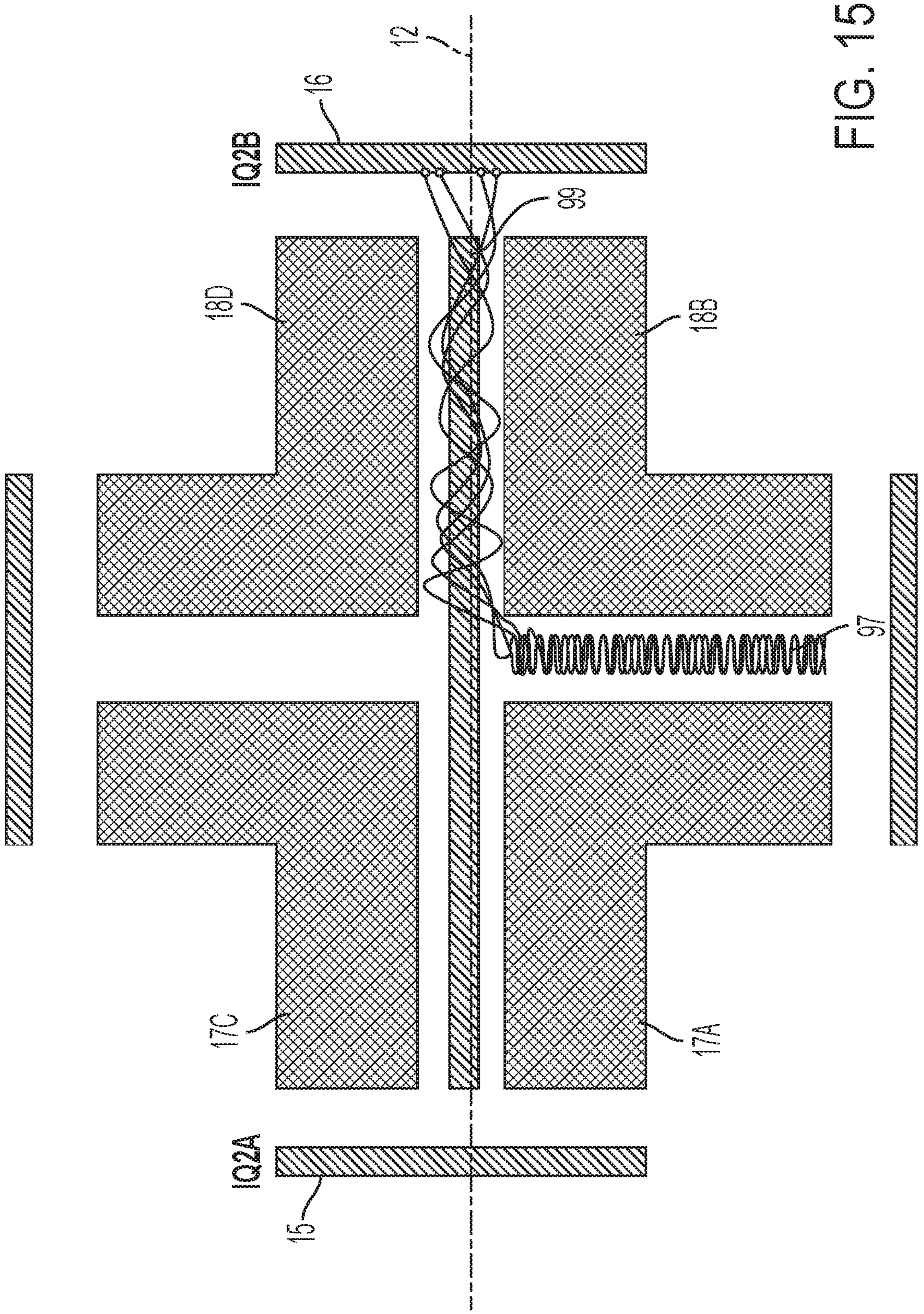
FIG. 15 is a schematic illustration of reaction product ions being selectively extracted from the apparatus of FIG. 10.

FIG. 15 illustrates the selective extraction of reaction product ions 99 from sequestration in the lower branch of the electron beam path. As described above, when the frequency of the quadrupole drive signal is tuned to a particular value, reaction product ions having a particular m/z are excited and permitted to escape sequestration and can be extracted by lowering the potential on extraction lens electrode 16.

Figure 16:
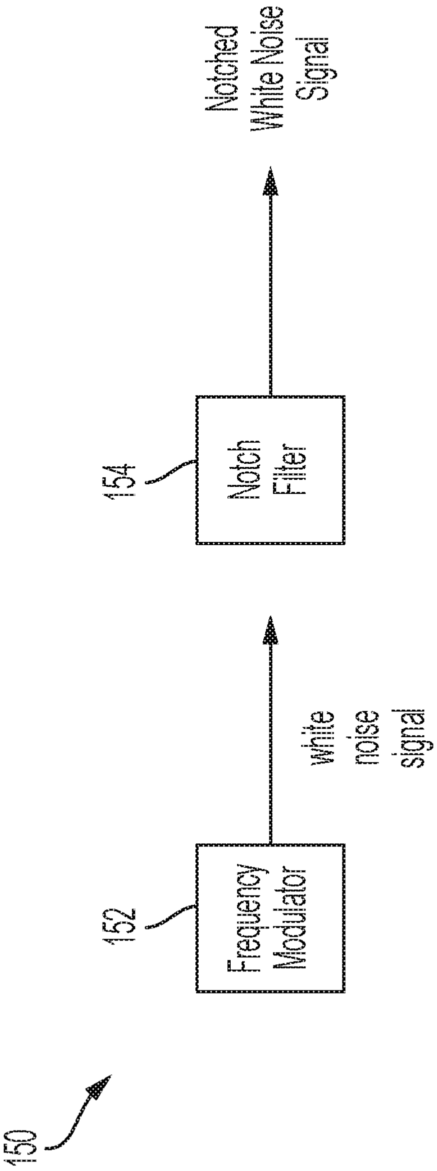
FIG. 16 is schematic illustration of drive circuitry for one or more auxiliary electrodes to confine precursor ions in the electron beam path while selectively permitting extraction of reaction products.

FIG. 16 is a schematic illustration of drive circuitry 150 configured to generate a notched white noise signal. Circuitry 150 can include a frequency modulator 152 (e.g., a frequency mixer capable of a generating a white noise signal) and a notch filter 154. The notch filter 154 is configured to suppress the resonant frequencies of the precursor ions, (and preferably charge reduced species, which have the same molecular mass but have a different charge state) before applying the signal to the one or more auxiliary electrodes 92 and/or 94. Or the same functionality of notching can be done by a digital wave form generation. A digital wave form generator is programed to produce a white noise but a predetermined frequency components are removed from the white noise.

It should be appreciated that numerous changes can be made to the disclosed embodiments without departing from the scope of the present teachings. While the foregoing figures and examples refer to specific elements, this is intended to be by way of example and illustration only and not by way of limitation. It should be appreciated by the person skilled in the art that various changes can be made in form and details to the disclosed embodiments without departing from the scope of the teachings encompassed by the appended claims.

The invention claimed is:

1. An ion sequestering apparatus comprising:

at least a first auxiliary electrode for use in an ion reaction instrument having RF electrodes adapted to guide positively-charged precursor ions along a first axis, and an electron source for introduction of an electron beam along a path transverse to the first axis such that electron activated dissociation of the precursor ions into reaction products can occur, the auxiliary electrode adapted for disposition parallel to the first axis to drive precursor ions into the electron beam path when a potential is applied to the auxiliary electrode, and drive circuitry for applying a supplemental AC signal to the at least one auxiliary electrode to confine precursor ions in the electron beam path while the reaction products are selectively extracted from the instrument.

2. The apparatus of claim 1 wherein the drive circuitry further comprises a notch filter and the drive circuitry is configured to apply a notched white noise signal to the at least one auxiliary electrode, whereby the notch filter suppresses frequencies at which the precursor ions would otherwise be excited.

3. The apparatus of claim 1 wherein the drive circuitry further comprises a digital wave form generator that produces notched white noise waveform and the drive circuitry is configured to apply a notched white noise signal to the at least one auxiliary electrode, whereby the notch filter suppresses frequencies at which the precursor ions would otherwise be excited.

4. The apparatus of claim 1 wherein the first auxiliary electrode is adapted for disposition parallel to, and on one side of, the first axis, the apparatus further comprising a second auxiliary electrode adapted for disposition parallel to, and on an opposite side of, the first axis.

5. The apparatus of claim 1 wherein the at least one auxiliary electrode is an elongated structure extending parallel to the first axis from one end proximal to a precursor ion entrance lens to a second end proximal to reaction product extraction lens.

6. The apparatus of claim 1 wherein the at least one auxiliary electrode has an elongated T-shape with a stem portion closest to the first axis and, optionally, wherein the at least one auxiliary electrode has a notched T-shape.

7. A method for performing an ion reaction, comprising:

introducing a plurality of ions into a dissociation instrument via a first pathway extending along a first central axis and defined by at least one plurality of electrodes, and an input lens electrode disposed in proximity to one end of the first pathway and an output lens electrode disposed in proximity to the other end of the first pathway;

introducing electrons from an electron source via a second pathway extending along a second central axis, said second pathway intersecting the first pathway at an intersection region so that the ions and electrons can interact; and providing at least one auxiliary electrode that can be activated to sequester ions in one or more sequester regions along the second central axis; and applying a supplemental AC signal to the least one auxiliary electrode to permit selective extraction of reaction products from the instrument.

8. The method of claim 7, wherein the method further comprises providing at least two auxiliary electrodes with one auxiliary electrode disposed parallel to, and on one side of, the first axis, and another auxiliary electrode disposed parallel to, and on an opposite side of, the first axis.

9. The method of claim 7, wherein the step of applying a supplemental AC signal to the least one auxiliary electrode further comprises applying the supplemental AC signal to the at least one auxiliary electrode to selectively excite reaction products such that precursor ions remain confined to the second pathway where they can interact with an electron beam while reaction products can be extracted.

10. The method of claim 7, wherein the supplemental AC signal further comprises a notched white noise signal, whereby a notch in the white noise signal suppresses frequencies at which the precursor ions would otherwise be excited.

11. The method of claim 7 wherein the drive circuitry further comprises a digital wave form generator that produces notched white noise waveform and the drive circuitry is configured to apply a notched white noise signal to the at least one auxiliary electrode, whereby the digitally generated white noise have suppressed frequencies at which the precursor ions would otherwise be excited.

12. The method of claim 10, wherein white noise signal is notched at the resonant frequencies of the precursor ions, and charge reduced species, which have the same molecular mass but have a different charge state.

13. The method of claim 7, wherein the at least one auxiliary electrode is an elongated structure extending parallel to the first axis from one end proximal to a precursor ion entrance lens to a second end proximal to reaction product extraction lens.

14. The method of claim 7, wherein the at least one auxiliary electrode has an elongated T-shape with a stem portion closest to the first axis.

15. The method of claim 7, wherein the at least one auxiliary electrode has a notched T-shape.

16. The method of claim 7, wherein the method further comprises selectively exciting reaction product ions following electron activated dissociation of the precursor ions by driving at least one set of RF electrodes with a supplemental AC signal that excites ions having a responsive m/z value.

17. The method of claim 7, wherein the method further comprises selectively extracting excited reaction product ions by lowering the potential of an extraction lens electrode at an extraction end of the first axis.

18. The method of claim 7, wherein the step of applying a supplemental AC signal further comprises selectively exciting reaction products such that precursor ions remain confined to the second pathway where they can interact with an electron beam while reaction products can be extracted.

19. The method of claim 7, wherein the step of applying a supplemental AC signal further comprises applying a notched white noise signal to the at least one auxiliary electrode, whereby the notch filter suppresses frequencies at which the precursor ions would otherwise be excited.

20. The method of claim 7, wherein the step of applying a supplemental AC signal further comprises applying a notched white noise signal to the at least one auxiliary electrode, whereby the digital wave form generator produces a white noise wave with suppressed frequencies at which the precursor ions would otherwise be excited.

* * * * *